US011875138B2

(12) United States Patent
Schwartz et al.

(10) Patent No.: US 11,875,138 B2
(45) Date of Patent: Jan. 16, 2024

(54) SYSTEM AND METHOD FOR MATCHING INTEGRATION PROCESS MANAGEMENT SYSTEM USERS USING DEEP LEARNING AND MATRIX FACTORIZATION

(71) Applicant: BOOMI, INC., Round Rock, TX (US)

(72) Inventors: Daniel Schwartz, Marlton, NJ (US); Michael J. Morton, Morrisville, NC (US)

(73) Assignee: BOOMI, LP, Chesterbrook, PA (US)

( * ) Notice: Subject to any disclaimer, the term of this patent is extended or adjusted under 35 U.S.C. 154(b) by 856 days.

(21) Appl. No.: 16/927,295

(22) Filed: Jul. 13, 2020

(65) Prior Publication Data

US 2022/0012022 A1   Jan. 13, 2022

(51) Int. Cl.
| | |
|---|---|
| G06F 8/34 | (2018.01) |
| G06N 3/08 | (2023.01) |
| G06F 8/35 | (2018.01) |
| G06F 3/048 | (2013.01) |
| G06Q 30/0202 | (2023.01) |

(52) U.S. Cl.
CPC ............... *G06F 8/34* (2013.01); *G06F 3/048* (2013.01); *G06F 8/35* (2013.01); *G06N 3/08* (2013.01); *G06Q 30/0202* (2013.01)

(58) Field of Classification Search
None
See application file for complete search history.

(56) References Cited

U.S. PATENT DOCUMENTS

| | | | |
|---|---|---|---|
| 10,839,014 B1 * | 11/2020 | Garcia Garcia | ....... G06N 3/084 |
| 2018/0285936 A1 * | 10/2018 | Parrotta, Jr. | ............ G06F 3/017 |
| 2019/0179664 A1 * | 6/2019 | Gujarathi | ............ H04L 63/0227 |

(Continued)

OTHER PUBLICATIONS

Wang et al., A Two-Stage Framework for Designing Visual Analytics System in Organizational Environments; IEEE Symposium on Visual Analytics Science and Technology Oct. 23-28, Providence, RI, USA, 978-1-4673-0014-8/11/$26.00 © 2011 IEEE.*

(Continued)

*Primary Examiner* — David J Stoltenberg
(74) *Attorney, Agent, or Firm* — Prol Intellectual Property Law, PLLC; H. Kenneth Prol

(57) ABSTRACT

A method of matching integration process users may comprise receiving execution logs recording data associated with selections of integration process visual elements, generating a user/visual element interaction matrix based on counts of integration process visual element selections, inputting the user/visual element interaction matrix into a trained neural network to generate an optimized user preference and visual element embedding matrices, determining a latent feature user preference value adapting positive user feedback to incorporate implicit negative feedback of users for the integration process visual elements based on the optimized user preference and visual element embedding matrices, identifying users associated with latent feature user preference values for one of the integration process visual elements falling within a preset range of each other as matching users, and transmitting identification of the matching users and identification of the one of the plurality of integration process visual elements to at least one matched user.

20 Claims, 10 Drawing Sheets

(56) References Cited

U.S. PATENT DOCUMENTS

2020/0242195 A1\* 7/2020 Souche ................ G06F 40/103

OTHER PUBLICATIONS

Bolte et al. discloses Vis-a-Vis: Visual Exploration of Visualization Source Code Evolution Journal of Latex Class Files, vol. 14, No. 8, Aug. 2015.\*
Daniel Reiss Harris discloses PrototypeML: A Neural Network Integrated Design and Development Environment, arXiv: 2007.01097v1 [cs.LG] Jul. 1, 2020.\*
Q. Han et al., "A Hybrid Recommender System for Patient-Doctor Matchmaking in Primary Care," Aug. 9, 2018, 10 pages, Proc. of the 5th IEEE International Conference on Data Science and Advanced Analytics (DSAA), https://arxiv.org/abs/1808.03265.
W. Cheng et al., "DELF: A Dual-Embedding based Deep Latent Factor Model for Recommendation." In IJCAI Jul. 13, 2018 (vol. 18, pp. 3329-3335).. https://www.ijcai.org/Proceedings/2018/0462.pdf.

\* cited by examiner

User/Visual Element Interaction Matrix

| | HTTP Connector Count | Disk Connector Count | FTP Connector Count | Mail Connector Count | ... | TransformMap Function Count | Mapping Count | JSON Profile Field Count | XML Profile Field Count |
|---|---|---|---|---|---|---|---|---|---|
| Customer A | 16 | 90 | 7 | 2 | • • • | 84 | 2058 | 465 | 892 |
| Customer B | 62 | 234 | 31 | 12 | • • • | 52 | 2107 | 351 | 342 |
| Customer C | 72 | 117 | 42 | 75 | • • • | 22 | 3000 | 219 | 258 |
| Customer D | 87 | 31 | 11 | 44 | • • • | 35 | 3962 | 431 | 732 |
| • • • | • | • | • | • | • • • | • | • | • | • |
| Customer E | 21 | 343 | 43 | 12 | • • • | 109 | 991 | 391 | 407 |
| Customer X | 59 | 74 | 38 | 135 | • • • | 86 | 3542 | 554 | 291 |
| Customer Y | 79 | 27 | 6 | 39 | • • • | 72 | 2224 | 914 | 123 |
| Customer Z | 13 | 16 | 2 | 92 | • • • | 23 | 4510 | 317 | 743 |

Users 510

Integration Process Visual Elements 520

User Preference Embedding Matrix 612

| | | | | | | | | | | | |
|---|---|---|---|---|---|---|---|---|---|---|---|
| Customer A | -0.2555 | -0.1889 | 0.7199 | -0.4417 | -0.2042 | -0.1374 | 0.0194 | 0.3533 | | | |
| Customer B | -0.2493 | -0.1249 | 0.0465 | 0.4845 | 0.451 | 0.2691 | 0.1554 | 0.6208 | | | |
| Customer C | -0.3507 | -0.2264 | 0.0423 | 0.236 | 0.1809 | -0.6393 | -0.0062 | | | | |
| Customer D | -0.4655 | -0.1647 | 0.0597 | -0.197 | 0.4871 | -0.1529 | 0.5236 | -0.4231 | | | |
| • | • | • | • | • | • | • | • | • | | | |
| • | • | • | • | • | • | • | • | • | | | |
| • | • | • | • | • | • | • | • | • | | | |
| Customer W | -0.1263 | -0.3822 | 0.4215 | 0.5816 | -0.2208 | 0.1226 | 0.0094 | -0.5081 | | | |
| Customer X | -0.4123 | -0.1009 | -0.41 | 0.1609 | -0.577 | -0.3459 | 0.367 | 0.1964 | | | |
| Customer Y | -0.2665 | -0.7433 | -0.3544 | -0.3176 | 0.1914 | 0.1125 | -0.3033 | -0.0939 | | | |
| Customer Z | -0.5253 | -0.4021 | -0.053 | -0.1031 | -0.2582 | 0.6412 | -0.2568 | -0.0717 | | | |

Visual Elements Embedding Matrix 622

| HTTP Connector Count | Disk Connector Count | FTP Connector Count | Mail Connector Count | ••• | TransformMap Function Count | Mapping Count | JSON Profile Field Count | XML Profile Field Count |
|---|---|---|---|---|---|---|---|---|
| -0.0161 | -0.0592 | -0.0292 | 0.056 | ••• | 0.6096 | -0.7137 | 0.1838 | -0.2783 |
| -0.026 | -0.2076 | 0.2543 | 0.916 | ••• | 0.0689 | 0.1535 | 0.1083 | -.1112 |
| -0.0061 | -0.0221 | 0.0126 | 0.1505 | ••• | -0.0606 | -0.4261 | -0.1886 | 0.6694 |
| -0.0191 | 0.0151 | -0.0835 | 0.0643 | ••• | -0.6514 | -0.5011 | -0.4028 | -0.388 |
| -0.016 | -0.1322 | 0.0681 | 0.1187 | ••• | -0.4416 | -0.1584 | 0.8606 | 0.0532 |
| -0.9763 | 0.1296 | -0.1624 | 0.0443 | ••• | 0.0123 | 0.0323 | 0.02 | 0.0122 |
| -0.1346 | -0.9562 | -0.0232 | -0.2318 | ••• | -0.0004 | 0.0335 | -0.1101 | 0.0077 |
| -0.1648 | 0.0639 | 0.9465 | 0.2474 | ••• | -0.0225 | -0.0841 | -0.0594 | -0.0261 |

Latent Feature Sparse Matrix 632

| 8701.1085 | 0 | 0 | 0 | ••• | 0 | 0 | 0 | 0 |
|---|---|---|---|---|---|---|---|---|
| 0 | 803.5016 | 0 | 0 | ••• | 0 | 0 | 0 | 0 |
| 0 | 0 | 732.5629 | 0 | ••• | 0 | 0 | 0 | 0 |
| 0 | 0 | 0 | 323.4578 | ••• | 0 | 0 | 0 | 0 |
| • | • | • | • | ••• | • | • | • | • |
| • | • | • | • | ••• | • | • | • | • |
| 0 | 0 | 0 | 0 | ••• | 87.2386 | 0 | 0 | 0 |
| 0 | 0 | 0 | 0 | ••• | 0 | 56.8637 | 0 | 0 |
| 0 | 0 | 0 | 0 | ••• | 0 | 0 | 21.8602 | 0 |
| 0 | 0 | 0 | 0 | ••• | 0 | 0 | 0 | 1.968 |

SYSTEM AND METHOD FOR MATCHING INTEGRATION PROCESS MANAGEMENT SYSTEM USERS USING DEEP LEARNING AND MATRIX FACTORIZATION

FIELD OF THE DISCLOSURE

The present disclosure relates generally to a system and method for deploying and executing customized data integration processes. More specifically, the present disclosure relates to matching users of the system for deploying and executing customized data integration processes that utilize similar integration processes.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, medical information processing, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), a head-mounted display device, server (e.g., blade server or rack server), a network storage device, a network storage device, a switch router or other network communication device, other consumer electronic devices, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. Further, the information handling system may include telecommunication, network communication, and video communication capabilities and require communication among a variety of data formats.

BRIEF DESCRIPTION OF THE DRAWINGS

The present disclosure will now be described by way of example with reference to the following drawings in which:

FIG. 5 is a block diagram illustrating a user/visual element interaction matrix according to an embodiment of the present disclosure;

FIG. 6 is a block diagram illustrating user and integration process visual elements embedding matrices according to an embodiment of the present disclosure;

The use of the same reference symbols in different drawings may indicate similar or identical items.

DETAILED DESCRIPTION

Figure 1:
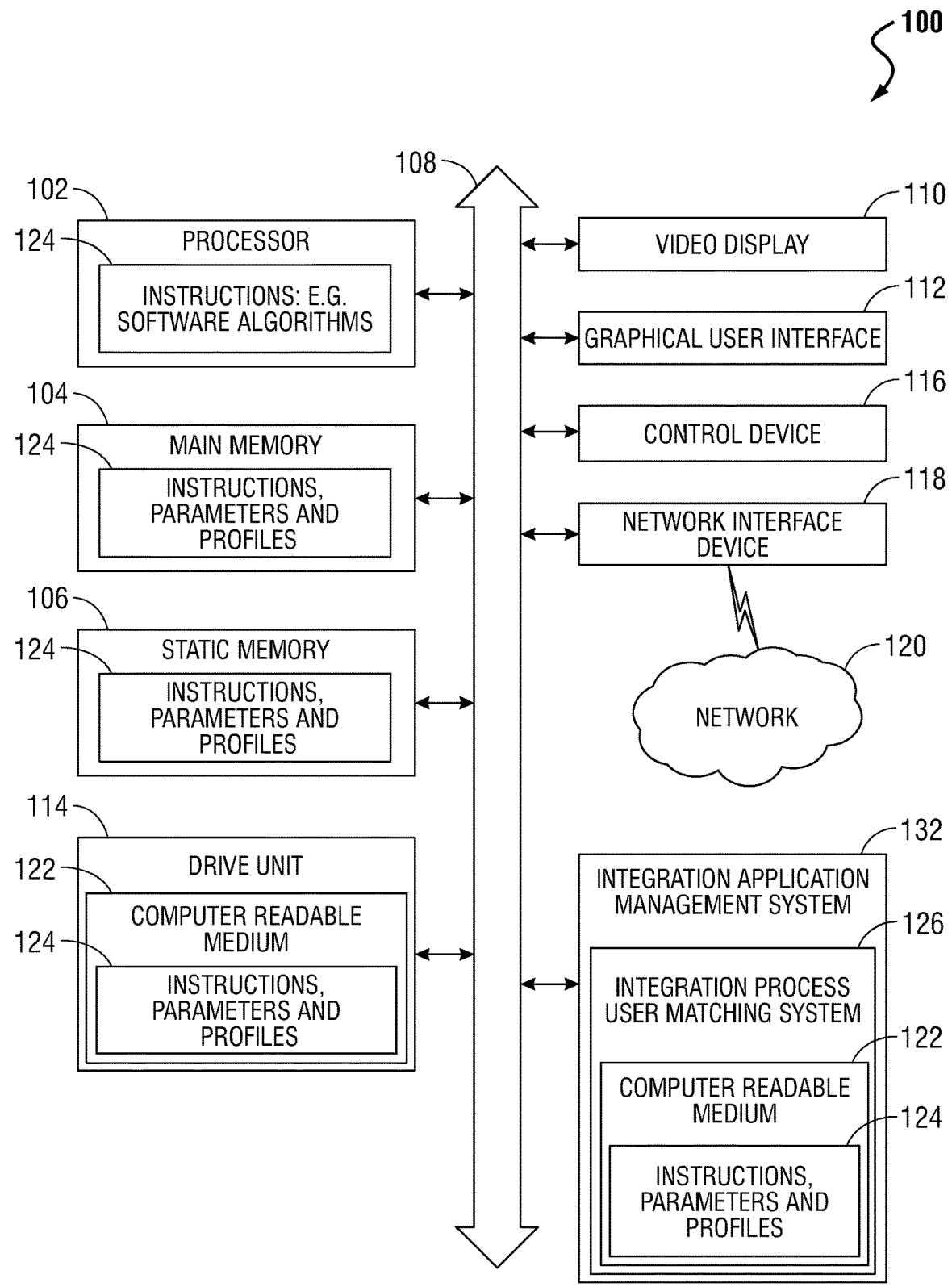
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Current methods of transacting business between or among a plurality of business entities involve the use of multiple software applications, application programming interfaces (APIs), or integration processes to transfer shared data among the plurality of businesses. Each of these business entities may use a different structure or method for receiving and storing the same type of information, causing each of these multiple applications, APIs, or integration processes to be customized to a particular business or group of businesses among which the same data may be shared. Embodiments of the present disclosure allow businesses to perform such necessary customization using an integration process modeling graphical user interface (GUI) that allows a user to model each step of the data sharing among the various businesses, using visual icons representing units of work to be performed within the integration process. An integration application management system managing such an integration process modeling GUI in embodiments described herein may generate the code instructions for performing this necessary customization of an integration process for a particular user's needs, and transmit these code instructions, along with a runtime engine for remote execution of those code instructions to an enterprise user's local network. In such a way, users may customize integration processes using these visual elements, without having to learn the underlying computer language that will execute these steps.

Hundreds, or even thousands of individual business or users may customize their particular integration processes using these visual elements and the integration process modeling GUI described directly above. The ways in which each business customizes their individual integration processes using these visual elements may provide information useful in understanding, anticipating, and addressing these businesses' needs. For example, a business may customize its integration processes to rely heavily on a mapping visual element to track a multitude of different names that the business' trading partners use to describe a single type of data (e.g., "diagnosis," "ICD-9," "ICD9," "med_history," "chart," etc., each used to describe medical history of a patient). This heavy reliance on tracking a multitude of names for the same type of data may indicate that business transacts data in an industry that does not require standardization of such data. In such a scenario, it may be helpful to put multiple businesses in this same situation in contact with one another, in order to facilitate communication that may assist in standardizing and thus streamlining each of their businesses.

As another example, a business that does not rely heavily on such a mapping visual element when customizing its integration process may transact data with a limited number of trading partners that tend to use the same or similar naming conventions as the business for the same types of data. This may result in such a business relying less heavily, or not at all, upon use of the mapping visual element during its integration process customization. However, should such a business scale up its business to transact such data among a larger volume of trading partners, the integration process for such transaction may need to be reconfigured to add such mapping elements. Because the use of such mapping elements may be equally helpful in several different industries, two businesses that both rely on such mapping elements may operate in completely different industries, and thus, may not compete directly with one another. In such a scenario, it may be helpful to put this business in the process of scaling up in contact with another business that already heavily relies on such mapping visual elements, in order to facilitate sharing of helpful advice and collaboration between the two. Thus, a method is needed to identify users of the integration process modeling GUI described above that may benefit by being placed in contact with one another.

Embodiments of the present disclosure address this issue by gauging users' preference values for each of the available visual elements these users may use to customize their integration processes, and matching users with similar needs. This matching process in embodiments described herein may begin with determining positive feedback each user has provided for each visual element in the form of execution logs indicating each user's execution of steps associated with each visual element within their respective customized integration processes. Such positive feedback, however, does not provide a complete picture of each user's true opinions with respect to these visual elements, because it fails to capture any negative feedback from such users. In order to account for this missing feedback, embodiments of the present disclosure may employ methods for gauging a user's true preference for a given visual element, based on only the positive feedback available. When referring to a user's "true" preferences for a visual element of aspects of utilizing a particular visual elements such as settings or parameters, the embodiments of the present disclosure assess those preferences with increased or optimized accuracy relative to user behavior to determine with greater accuracy those preferences or selections.

Several methods exist to gauge such "true" preferences for an item (e.g., product available for purchase, or a type of visual element selected within the integration process modeling GUI) based on limited feedback, mostly involving modeling a user's unrecorded or unknown preferences for a plurality of that item's features. For example, a provider managing the integration process modeling GUI may receive positive feedback from a user with respect to a given visual element each time that user executes an integration process modeled using that visual element. Such feedback does not necessarily capture negative feedback such as a user's dissatisfaction with that integration process following its execution, and that user choosing to employ a different visual element in the next integration process execution. Such a choice to switch visual elements may be due to minor variations in the way the process represented by each visual element works. For example, a user may be dissatisfied with an HTTP connector visual element operating to transfer data using the hypertext transfer protocol (HTTP) via websites because it resulted in a slower than anticipated execution. In such a scenario, the same user may choose to replace the HTTP connector visual element with a File Transfer Protocol (FTP) connector visual element for the next integration process execution in order to hopefully decrease the time to completion.

The service provider managing the integration process modeling GUI may not receive any negative feedback regarding the use of the HTTP connector visual element from this user, thus inhibiting the service provider's ability to accurately gauge user preference for the HTTP connector visual element or to provide alternatives to this visual element that users may prefer. For example, none of the interactions between the user and the integration process modeling GUI may clearly indicate the user's preference for transferring data via the FTP protocol rather than the HTTP protocol. Several methods have been developed in other industries in order to model user preference, such as the online retail industry, social media applications, news outlet applications, and dating applications. Because users in each of these industries, as well as the integration process industry make decisions based on many underlying considerations, these methods attempt to model user's preference for each of these underlying considerations. For example, a user choosing between two different sets of wireless headphones offered for sale via an online retailer may consider several features of each of these headphones, including battery life, availability of a warranty, technical support, noise cancelling capabilities, size of earphones, popularity and price. Other users may decide between the same set of headphones based on other or additional features, or may prioritize these features differently.

Similarly, users of the integration process modeling GUI may choose between two different visual elements based on underlying considerations such as the time it takes to complete the modeled process, difficulty level for customizing a visual element to that user's needs, overall complexity of the full integration process including all visual elements, frequency of failed or aborted integration processes modeled using that visual element, etc. These are only a few of such underlying considerations, and much like the online retail example described above, each user may have different underlying considerations, and may prioritize them differently.

In both of these example scenarios, the online retailer or the service provider of the integration process modeling GUI may not know or have any way of determining which underlying considerations each of its users takes into account when choosing an item or a visual element, nor the priority that user places on any given underlying considerations. These underlying considerations may thus be referred to herein as "latent features" of a visual element, because they represent or model the user's preference for an unknown characteristic of any given visual element. As described herein, the service provider of the integration process modeling GUI may not have any way of determining the number or identity of each of these latent features for any given user. Even the user may not consciously identify these latent features when deciding which visual element to select, but may still subconsciously consider such features. Thus, a method of modeling a user's preference for these latent features based only on gathered positive feedback in the form of executed processes modeled using any given visual element is needed.

Matrix factorization and deep learning via a neural network may provide such a method of modeling a user's preferences for these latent features. Such a method may overcome this inability of the integration process modeling GUI service provider to determine the number or identity of such latent features. Identifying each of the latent features or underlying considerations upon which a user bases her decisions (e.g., which visual element to use to model an integration process) involves several unknown variables. The matrix factorization method may be used to decrease the number of variables required to determine a user's true preferences (including consideration of latent features) that are unknown. Such a method may begin by generating a user/visual element interaction matrix that records all of the measured positive feedback gathered by the service provider for the integration process modeling GUI for a given time period. For example, such a user/visual element interaction matrix may record the total number of times in a month each user executes an integration process modeled by each visual element. In other words, each row of the user/visual element matrix may be associated with a single user, and each column of the user/visual element matrix may be associated with a single visual element. Any single cell within the user/visual element matrix may represent the number of times the user associated with that row executed an integration process modeled using the visual element associated with that column.

The matrix factorization method may further include generating three new matrices that are interrelated according to preset requirements, based on the user/visual element interaction matrix. By applying these preset requirements, the number of unknown variables may be decreased. For example, a matrix factorization method may be used to generate matrices including a user preference embedding matrix, and a visual element embedding matrix based on the user/visual element interaction matrix. The cells of each row of the user preference embedding matrix may provide a value gauging a single user's true preference for a preset number of latent features. The cells of each column of the visual element embedding matrix may provide a value gauging the prevalence of each of the present number of latent features within a single visual element.

The step of generating these two matrices, by itself, does not decrease the number of unknowns. However, a further step defining the relationships between each of the cells within these matrices may do just that. For example, such a method may also involve generating a third matrix that is the dot product of the user preference embedding matrix and the visual elements embedding matrix. A specific matrix decomposition method called a singular value decomposition method may generate the user preference embedding matrix and the item embedding matrix by requiring the third matrix (e.g., a dot product of the first two) to have non-zero values only in the cells that are oriented diagonally across this third matrix. In other words, most of the values within this third matrix are set to zero, and thus are known, decreasing the number of unknown variables. This type of matrix is referred to herein as a "sparse" matrix, because the number of non-zero values is "sparse" in comparison to the number of cells holding a value of zero. Use of such a sparse matrix decreases the number of unknown variables involved in generating the user preference embedding matrix and the visual element embedding matrix. Further, many singular value decomposition methods exist in the art (e.g., within the coding language Python), and require only the input of the user/visual element interaction matrix, and a set number of latent features to consider.

Upon generation of the user preference embedding matrix and the visual element embedding matrix using such a singular value decomposition method, a user's "true" preference for any given visual element, taking into account a user's preference for unknown latent features may be determined. For example, such a "true" preference may be determined by taking a dot product of the row within the user preference embedding matrix associated with that user and the column within the visual element embedding matrix associated with a given visual element. A dot product may be determined by multiplying each cell within the row by each cell within the column, then adding all of these products together, to give a user's "true" preference for a given visual element.

As described herein, the number of latent features to consider cannot be measured, and thus, the setting of such a number when initiating a singular value decomposition method may comprise a guess or estimate. The values within each cell of the user preference embedding matrix and the visual element embedding matrix (and consequently a user's "true" preference for any given visual element) will vary as the preset number of latent features varies. In other words, in order to accurately determine or model a user's "true" preference for a given visual element for modeling an integration process, a service provider for the integration process modeling GUI may need to identify an optimal preset number of latent features used to generate the user preference embedding matrix and the visual element embedding matrix.

An optimal number of latent features results in a most accurate prediction of a user's true preference for a visual element. Considering too few or too many latent features may result in inaccurate predictions. For example, one issue common to such prediction methods is called "overfit," and is caused when too many latent features are considered. In such a scenario, the resulting prediction of a user's preference for a visual element is very close or exactly identical to the known positive feedback. In the real-world context, this results in under consideration of a user's unrecorded negative feedback, and an artificially inflated gauge of effectiveness of a given visual element in meeting a user's needs. It also fails to provide the information needed, in order for the service provider of the integration process modeling GUI to place users with similar needs in contact with one another. Thus, a method is needed to identify and apply an optimal number of latent features during the matrix decomposition.

The integration process user matching system in embodiments described herein may address this issue by using a multi-layered neural network and deep learning approach to identify an optimal number of latent features, and thus, more accurately gauge users' preferences for a variety of visual elements. In embodiments described herein, a neural network may be trained to produce the most accurate user preference embedding matrix and visual element embedding matrix for an input user/visual element interaction matrix. For example, one of a plurality of test user/visual element interaction matrices, a validation test user/visual element interaction matrix, and the preset latent features value may form the input layer of such a neural network. These input values may be forward propagated through the neural network to produce an initial output layer that includes a test latent feature sparse matrix, a validation latent feature sparse matrix, and a difference between the root mean square errors for each of these matrices. Such a difference in root mean square errors may represent a rough gauge of the differences between each of these sparse matrices, and thus, a gauge of the accuracy of each of the decomposed embedding matrices. The difference in root mean square errors for the test latent feature sparse matrix and the validation latent feature sparse matrix may thus form the error function for the neural network.

This error function may then be back propagated through the neural network to adjust the weights of each layer of the neural network. The latent features value (and consequently all decomposed matrices) may be optimized in embodiments by minimizing the difference in the root mean square errors of the test latent feature sparse matrix and the validation latent feature sparse matrix. Such forward propagation and backward propagation may be repeated serially during training of the neural network, adjusting the error function during each repetition, until the error function falls below a preset threshold value. In other words, the weights of the layers of the neural network may be serially adjusted until the root mean square error for the test latent feature sparse matrix nearly matches the root mean square error for the validation latent feature sparse matrix. In such a way, the neural network may be trained to provide the most accurate output layer, including an optimized user preference embedding matrix and an optimized visual element embedding matrix.

Once training of the neural network is complete, the integration process user matching system in embodiments described herein may input into the neural network a user/visual element interaction matrix generated based on data not included within the test or validation inputs described above. The neural network may then output an optimized user preference embedding matrix and optimized visual element embedding matrix. A single user's preference for a single visual element, in an example embodiment, may then be determined by taking a dot product of the column for that single visual element within the visual elements embedded matrix and the row for that single user within the user preference embedding matrix. In the example embodiment, such a dot product may yield a single value, which may constitute a latent feature user preference value or "true" preference for that visual element, which incorporates unknown but implicit negative feedback that is not gathered directly. The focus on latent feature user preference values provide for increase accuracy toward "true" preference assessment of a user allowing for increased accuracy of prediction and also more accurate matching with other users.

The integration process user matching system in embodiments described herein may further identify a plurality of users having similar or matching latent feature user preference values for one or more visual elements. For example, users having latent feature user preference values falling within a preset range of values for a single visual element, or for a combination of elements may be deemed to "match." In such a scenario, these "matching" latent feature user preference values may reflect users with similar or complimentary needs. For example, two users with the same high reliance on a mapping visual element, as represented by each user being associated with a high latent feature user preference value for the mapping visual element may both be active in an industry in which data transfer has not been standardized (e.g., health care). In performing such a matching method, the integration process user matching system may identify a group of users employing similar integration process sub-processes, and potentially encountering the same types of issues during execution of those integration processes, or even during their regular courses of business. In such a way, the integration process user matching system may place these like-minded users in contact with one another to form a community of users that may benefit from one another's insights into troubleshooting, business development, or scaling up of existing processes.

FIG. 1 is a block diagram illustrating an information handling system, according to an embodiment of the present disclosure. Information handling system 100 can include processing resources for executing machine-executable code, such as a central processing unit (CPU), a programmable logic array (PLA), an embedded device such as a System-on-a-Chip (SoC), or other control logic hardware used in an information handling system several examples of which are described herein. Information handling system 100 can also include one or more computer-readable media for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

FIG. 1 illustrates an information handling system 100 similar to information handling systems according to several aspects of the present disclosure. For example, an information handling system 100 may be any mobile or other computing device capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions.

Information handling system 100 can include devices or modules that embody one or more of the devices or execute instructions for the one or more systems and modules herein, and operates to perform one or more of the methods. The information handling system 100 may execute code 124 for the integration process user matching system 126, the integration application management system 132, or execute a business data integration process. These may operate on servers or systems, remote data centers, or on-box in individual client information handling systems such as a local display device, or a remote display device, according to various embodiments herein. The integration application management system 132 in an embodiment may operate to manage an integration process modelling graphical user interface (GUI) users may employ to model various tasks within a business data integration process by a variety of visual elements. The integration process user matching system 126 in an embodiment may operating to place users with matching preferences in visual elements used to model business data integration processes in contact with one another. In some embodiments, it is understood any or all portions of code 124 for the integration process user matching system 126, the integration application management system 132, or the business data integration process may operate on a plurality of information handling systems 100.

The information handling system 100 may include a processor 102 such as a central processing unit (CPU), a graphics-processing unit (GPU), control logic or some combination of the same. Any of the processing resources may operate to execute code that is either firmware or software code. Moreover, the information handling system 100 can include memory such as main memory 104, static memory 106, drive unit 114, or the computer readable medium 122 of the integration process user matching system 126, or the integration application management system 132 (volatile (e.g. random-access memory, etc.), nonvolatile (read-only memory, flash memory etc.) or any combination thereof). Additional components of the information handling system can include one or more storage devices such as static memory 106, drive unit 114, and the computer readable medium 122 of the integration process user matching system 126, or the integration application management system 132. The information handling system 100 can also include one or more buses 108 operable to transmit communications between the various hardware components such as any combination of various input and output (I/O) devices. Portions of an information handling system may themselves be considered information handling systems.

As shown, the information handling system 100 may further include a video display 110, such as a liquid crystal display (LCD), an organic light emitting diode (OLED), a flat panel display, a solid state display, or other display device. Additionally, the information handling system 100 may include a control device 116, such as an alpha numeric control device, a keyboard, a mouse, touchpad, camera, fingerprint scanner, retinal scanner, face recognition device, voice recognition device, or gesture or touch screen input.

The information handling system 100 may further include an integration process modelling graphical user interface (GUI) 112. The integration process modelling graphical user interface 112 in an embodiment may provide a visual designer environment permitting a user to define process flows between applications/systems, such as between trading partner and enterprise systems, and to model a customized business integration process to interface with and utilize the integration application management system 132. The graphical user interface 112 in an embodiment may provide a menu of pre-defined user-selectable visual elements and permit the user to arrange them as appropriate to model a process and may be displayed on the video display 110. The elements may include visual, drag-and-drop icons representing specific units of work required as part of the integration process, such as invoking an application-specific connector, transforming data from one format to another, routing data down multiple paths of execution by examining the contents of the data, business logic validation of the data being processed, etc.

The integration application management system 132 in an embodiment may generate code instructions for executing the integration process modeled by each of these visual elements in an embodiment. The integration process user matching system 126 in an embodiment may record each execution by each user of an integration process modeled using one of the visual elements via the integration process modeling GUI 112. Using matrix factorization and deep learning via a neural network, the integration process user matching system 126 in such an embodiment may determine latent feature user preference values of each user for each visual element, based on the recorded previous executions of integration processes modeled using these visual elements. Such latent feature user preference values in an embodiment may take into account each user's preferences or priority for various underlying characteristics of a given visual element, in order to provide a more accurate reflection of the user's preference for a given visual element. The integration process user matching system 126 in an embodiment may further identify two or more users having "matching" or similar preference values for one or more visual elements, and place them into contact with one another.

Further, the graphical user interface 112 allows the user to provide user input to the integration application management system 132 providing information relating to trading partners, activities, enterprise applications, enterprise system attributes, and/or process attributes that are unique to a specific enterprise end-to-end business integration process. For example, the graphical user interface 112 may provide drop down or other user-selectable menu options for identifying trading partners, application connector and process attributes/parameters/settings, etc., and dialog boxes permitting textual entries by the user, such as to describe the format and layout of a particular data set to be sent or received, for example, a Purchase Order.

The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

The information handling system 100 can include a set of instructions 124 that can be executed to cause the computer system to perform any one or more of the methods or computer based functions disclosed herein. For example, information handling system 100 includes one or more application programs 124, and Basic Input/Output System and Firmware (BIOS/FW) code 124. BIOS/FW code 124 functions to initialize information handling system 100 on power up, to launch an operating system, and to manage input and output interactions between the operating system and the other elements of information handling system 100. In a particular embodiment, BIOS/FW code 124 reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in static memory 106, drive 114, in a ROM (not illustrated) associated with information handling system 100 or other memory. Other options include application programs and BIOS/FW code sourced from remote locations, for example via a hypervisor or other system, that may be associated with various devices of information handling system 100 partially in memory 104, storage system 106, drive unit 114 or in a storage system (not illustrated) associated with network interface device 118 or any combination thereof. Application programs 124, and BIOS/FW code 124 can each be implemented as single programs, or as separate programs carrying out the various features as described herein. Application program interfaces (APIs) such as WinAPIs (e.g. Win32, Win32s, Win64, and WinCE), proprietary APIs (e.g., for SalesForce™ or Oracle's™ NetSuite™), or an API adhering to a known open source specification (e.g., Swagger™) may enable application programs 124 to interact or integrate operations with one another.

In an example of the present disclosure, instructions 124 may execute software for determining users' preferences for certain sub-processes within modeled integration processes, and for placing users with similar preferences in contact with one another. The computer system 100 may operate as a standalone device or may be connected, such as via a network, to other computer systems or peripheral devices.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The disk drive unit 114, and the integration process user matching system 126, or the integration application management system 132 may include a computer-readable medium 122 such as a magnetic disk, or a solid-state disk in an example embodiment. The computer-readable medium of the memory 104, storage devices 106 and 114, the integration process user matching system 126, or the integration application management system 132 may store one or more sets of instructions 124, such as software code corresponding to the present disclosure.

The disk drive unit 114, static memory 106, and computer readable medium 122 of the integration process user matching system 126, or the integration application management system 132 also contain space for data storage such as an information handling system for managing locations of executions of customized integration processes in endpoint storage locations. Connector code sets, and trading partner code sets may also be stored in part in the disk drive unit 114, static memory 106, or computer readable medium 122 of the integration process user matching system 126, or the integration application management system 132 in an embodiment. In other embodiments, data profile code sets, and run-time engines may also be stored in part or in full in the disk drive unit 114, static memory 106, or computer readable medium 122 of the integration process user matching system 126, or the integration application management system 132. Further, the instructions 124 of the integration process user matching system 126, or the integration application management system 132 may embody one or more of the methods or logic as described herein.

In a particular embodiment, the instructions, parameters, and profiles 124, and the integration process user matching system 126, or the integration application management system 132 may reside completely, or at least partially, within the main memory 104, the static memory 106, disk drive 114, and/or within the processor 102 during execution by the information handling system 100. Software applications may be stored in static memory 106, disk drive 114, the integration process user matching system 126, or the integration application management system 132.

Network interface device 118 represents a NIC disposed within information handling system 100, on a main circuit board of the information handling system, integrated onto another component such as processor 102, in another suitable location, or a combination thereof. The network interface device 118 can include another information handling system, a data storage system, another network, a grid management system, another suitable resource, or a combination thereof, and may communicate via a wired connection or wirelessly.

The integration process user matching system 126, or the integration application management system 132 may also contain computer readable medium 122. While the computer-readable medium 122 is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include the integration process user matching system 126, or the integration application management system 132, which may be operably connected to the bus 108. The integration process user matching system 126 is discussed in greater detail herein below.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device). The system, device, or module can include software, including firmware embedded at a device, such as an Intel® Core class processor, ARM® brand processors, Qualcomm® Snapdragon processors, or other processors and chipset, or other such device, or software capable of operating a relevant environment of the information handling system. The system, device or module can also include a combination of the foregoing examples of hardware or software. In an example embodiment, the integration process user matching system 126, or the integration application management system 132 and the several modules described in the present disclosure may be embodied as hardware, software, firmware or some combination of the same. Note that an information handling system can include an integrated circuit or a board-level product having portions thereof that can also be any combination of hardware and software. Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Figure 2:
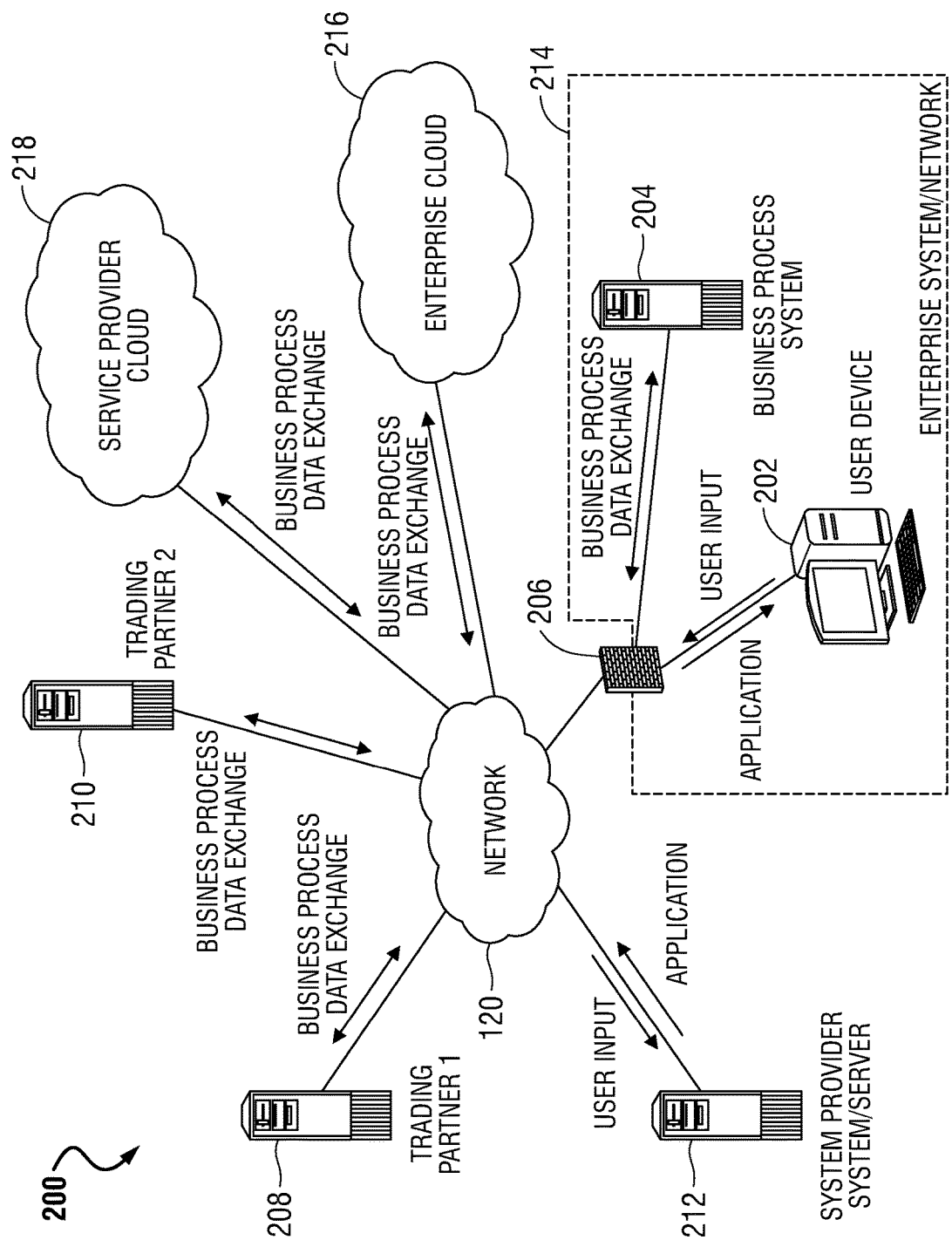
FIG. 2 is a block diagram illustrating a simplified integration network according to an embodiment of the present disclosure.

FIG. 2 is a graphical diagram illustrating a simplified integration network 200 including a service provider system/server 212 and an enterprise system/network 214 in an embodiment according to the present disclosure. Actual integration network topology could be more complex in some other embodiments. As shown in FIG. 2, an embodiment may include conventional computing hardware of a type typically found in client/server computing environments. More specifically, the integration network 200 in an embodiment may include a conventional user/client device 202, such as a conventional desktop or laptop PC, enabling a user to communicate via the network 120, such as the Internet. In another aspect of an embodiment, the user device 202 may include a portable computing device, such as a computing tablet, or a smart phone. The user device 202 in an embodiment may be configured with conventional web browser software, such as Google Chrome®, Firefox®, or Microsoft Corporation's Internet Explorer® for interacting with websites via the network 120. In an embodiment, the user device 202 may be positioned within an enterprise network 214 behind the enterprise network's firewall 206, which may be of a conventional type. As a further aspect of an embodiment, the enterprise network 214 may include a business process system 204, which may include conventional computer hardware and commercially available business process software such as QuickBooks, SalesForce's™ Customer Relationship Management (CRM) Platform, Oracle's™ Netsuite Enterprise Resource Planning (ERP) Platform, Infor's™ Warehouse Management Software (WMS) Application, or many other types of databases.

Current methods of transacting business between or among a plurality of business entities involve the use of multiple software applications, application programming interfaces (APIs), or integration processes to transfer shared data among the plurality of businesses. In an embodiment, the integration network 200 may further include trading partners 208 and 210 operating conventional hardware and software for receiving and/or transmitting data relating to business-to-business transactions. For example, Walmart® may operate trading partner system 208 to allow for issuance of purchase orders to suppliers, such as the enterprise 214, and to receive invoices from suppliers, such as the enterprise 214, in electronic data form as part of electronic data exchange processes. Electronic data exchange process in an embodiment may include data exchange via the world wide web. In other embodiments, electronic data exchange processes may include data exchange via File Transfer Protocol (FTP) or Secure File Transfer Protocol (SFTP).

Each of these business entities may use a different structure or method for receiving and storing the same type of information, causing each of these multiple applications, APIs, or integration processes to be customized to a particular business or group of businesses among which the same data may be shared. Embodiments of the present disclosure allow businesses to perform such necessary customization using an integration process modeling graphical user interface (GUI) that allows a user to model each step of the data sharing among the various businesses, using visual icons representing units of work to be performed within the integration process. In an embodiment, a provider of a service ("service provider") for creating on-demand, real-time creation of customized data integration software applications may operate a service provider server/system 212 within the integration network 200. The service provider system/server 212 may be specially configured in an embodiment, and may be capable of communicating with devices in the enterprise network 214.

The service provider system/server 212 in an embodiment may host an integration process-modeling user interface in an embodiment. Such an integration process-modeling user interface may allow a user or the integration process user matching system to model an integration process including one or more sub-processes for data integration through a business process data exchange between an enterprise system/network 214 and outside entities or between multiple applications operating at the business process system 204. The integration process modeled in the integration process-modeling user interface in an embodiment may be a single business process data exchange shown in FIG. 2, or may include several business process data exchanges shown in FIG. 2. For example, the enterprise system/network 214 may be involved in a business process data exchange via network 120 with a trading partner 1, and/or a trading partner 2. In other example embodiments, the enterprise system/network 214 may be involved in a business process data exchange via network 120 with a service provider located in the cloud 218, and/or an enterprise cloud location 216. For example, one or more applications between which a data set field value may be transferred, according to embodiments described herein, may be located remotely from the enterprise system 214, at a service provider cloud location 218, or an enterprise cloud location 216.

A user may access an integration process-modeling user interface in an embodiment to model one or more business process data exchanges via network 120 within an integration process by adding one or more integration process visual elements or code sets to an integration process flow. These integration process visual elements in an embodiment may model the ways in which a user wishes data to be accessed, moved, and/or manipulated during the one or more business process data exchanges.

An integration application management system managing such an integration process modeling GUI in embodiments described herein may generate the code instructions for performing this necessary customization of an integration process for a particular user's needs, and transmit these code instructions, along with a runtime engine for remote execution of those code instructions to an enterprise user's local network. Each integration process visual element the user adds to the integration process flow diagram in an embodiment may be associated with a pre-defined subset of code instructions stored at the service provider systems/server 212 in an embodiment. Upon the user modeling the integration process, the service provide system/server 212 in an embodiment may generate a run-time engine capable of executing the pre-defined subsets of code instructions represented by the integration process visual elements chosen by the user. The runtime engine may then execute the subsets of code instructions in the order defined by the modeled flow of the integration process visual elements given in the integration process flow diagram. In such a way, an integration process may be executed without the user having to access, read, or write the code instructions of such an integration process.

In other aspects of an embodiment, a user may initiate a business process data exchange between one cloud service provider 218 and one cloud enterprise 216, between multiple cloud service providers 218 with which the enterprise system 214 has an account, or between multiple cloud enterprise accounts 216. For example, enterprise system 214 may have an account with multiple cloud-based service providers 218, including a cloud-based SalesForce™ CRM account and a cloud-based Oracle™ Netsuite™ account. In such an embodiment, the enterprise system 214 may initiate business process data exchanges between itself, the SalesForce™ CRM service provider and the Oracle™ Netsuite service provider.

Hundreds, or even thousands of individual business or users may customize their particular integration processes using these visual elements and the integration process modeling GUI described directly above. The ways in which each business customizes their individual integration processes using these visual elements may provide information useful in understanding, anticipating, and addressing these businesses' needs. A method is needed to identify users of the integration process modeling GUI described above that may benefit by being placed in contact with one another.

Embodiments of the present disclosure address this issue by gauging users' preference values for each of the available visual elements these users may use to customize their integration processes, and matching users with similar needs.

Figure 3:
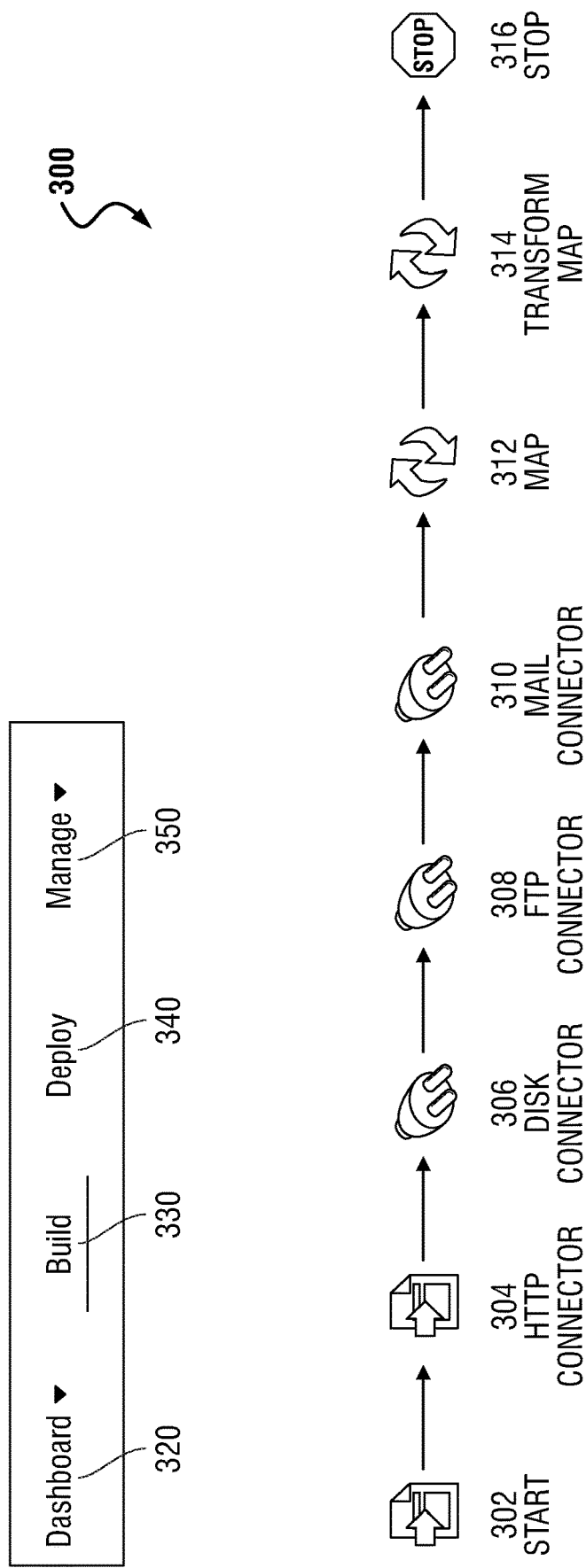
FIG. 3 is a graphical diagram illustrating a user-generated flow diagram of an integration process according to an embodiment of the present disclosure.

FIG. 3 is a graphical diagram illustrating a user-generated flow diagram of an integration process for exchange of electronic data records according to an embodiment of the present disclosure. The flow diagram in an embodiment may be displayed within a portion of a graphical user interface 300 that allows the user to build the process flow, deploy the integration process modeled thereby (e.g., by selecting the deploy tab 340), manage dataset field values manipulated by such an integration process (e.g., by selecting the manage tab 350), and to view high-level metrics associated with execution of such an integration process (e.g., by selecting the dashboard tab 320). The user may build the process flow and view previously built process flow diagrams by selecting the "Build" tab 330 in an embodiment, such as via a drop down menu in embodiments. A user may generate a flow diagram in an embodiment by providing a chronology of process-representing integration visual elements via the use of an integration process-modeling user interface. In some embodiments, the integration process-modeling user interface may take the form of a visual user interface. In such embodiments, the user-selectable visual elements representing integration sub-processes (e.g. connector integration elements) may be visual icons.

An integration process-modeling user interface in an embodiment may provide a design environment permitting a user to define process flows between applications/systems, such as between trading partner and enterprise systems, between on-site data centers and cloud-based storage modules, or between multiple applications, and to model a customized business integration process. Such an integration process-modeling user interface in an embodiment may provide a menu of pre-defined user-selectable elements representing integration sub-processes and permit the user or the data integration protection assistance system to arrange them as appropriate to model a full integration process. For example, in an embodiment in which the integration process-modeling user interface is a graphical user interface, the elements may include visual, drag-and-drop icons representing specific units of work (known as process components) required as part of the integration process. Such process components in an embodiment may include invoking an application-specific connector to access, and/or manipulate data. In other embodiments, process components may include tasks relating to transforming data from one format to another, routing data down multiple paths of execution by examining the contents of the data, business logic validation of the data being processed, etc.

Each process component as represented by integration sub-process icons or elements may be identifiable by a process component type, and may further include an action to be taken. For example, a process component may be identified as a "connector" component. Each "connector" component, when chosen and added to the process flow in the integration process-modeling user interface, may allow a user to choose from different actions the "connector" component may be capable of taking on the data as it enters that process step. Further the integration-process modeling user interface in an embodiment may allow the user to choose the data set or data element upon which the action will be taken. The action and data element the user chooses may be associated with a connector code set, via the integration application management system, which may be pre-defined and stored at a system provider's memory in an embodiment.

In an embodiment, a user may choose a process component it uses often when interfacing with a specific trade partner or application, and define the parameters of that process component by providing parameter values specific to that trading partner or application. If the user wishes to use this process component, tailored for use with that specific trading partner or application repeatedly, the user may save that tailored process component as a trading partner or component named specifically for that application. For example, if the user often accesses NetSuite™ or SalesForce™, the user may create a database connector process component, associated with a pre-built connector code set that may be used with any database, then tailor the database connector process component to specifically access NetSuite™ or SalesForce™ by adding process component parameters associated with one of these applications. If the user uses this process component in several different integration processes, the user may wish to save this process component for later use by saving it as a NetSuite™ or SalesForce™ process component. In the future, if the user wishes to use this component, the user may simply select the NetSuite™ or SalesForce™ component, rather than repeating the process of tailoring a generic database connector process component with the specific parameters defined above.

As shown in FIG. 3, process-representing visual elements may include a start element 302, a HyperText Transfer Protocol (HTTP) connector element 304, a disk connector element 306, a file transfer protocol (FTP) connector element 308, a mail connector element 310, and map element 312, a transform map element 314, or a stop element 316. Other embodiments may also include a branch element, a decision element, a data process element, or a process call element, for example. Each of the connector elements 304, 306, 308, 310, and a start element 302 in an embodiment may represent a sub-process of an integration process describing the accessing and/or manipulation of data. The start element 302 in an embodiment may also operate as a connector element.

In an embodiment, a start element 302 may operate to begin a process flow, and a stop element 316 may operate to end a process flow. As discussed above, each visual element may require user input in order for a particular enterprise or trading partner to use the resulting process. The start element 302 in an embodiment may further allow or require the user to provide data attributes unique to the user's specific integration process, such as, for example, the source of incoming data to be integrated. For example, the user or the integration process user matching system may use a connector element to define a connection (e.g., an application managing data upon which action is to be taken), and the action to be taken. A user may use a start element 302 to further define a location of such data, according to the language and storage structure understood by the application managing such data.

Users may choose from various sub-types of connector visual elements in an embodiment. For example, an HTTP connector element 304 in an embodiment may operate to send or receive datasets to or from an HTTP-enabled server. The code set associated with HTTP connector element 304 in an embodiment may be written using basic HTTP commands, which may be easier to develop than developing a Simple Object Access Protocol (SOAP) specification for communication with such HTTP-enabled servers. As another example, a disk connector element 306 in an embodiment may operate to read and write data sets from an underlying file system of the host machine in the user's enterprise network. Such datasets may be sent to directories on any disk to which the host machine has access, which may include trading partner's networks or machines, if such remote locations have granted the host machine Virtual Private Network (VPN) access. In another example, an FTP connector element 308 in an embodiment may operate to download or upload files to an FTP-enabled server. Such a connector may access any FTP server connected to the internet, and may offer a viable alternative to a traditional Value Added Network (VAN), because there are no ongoing document fees when exchanging data via internet-based FTP. In yet another example, a mail connector element 310 may operate to read email from a Post Office Protocol (POP) email server and send email to an Simple Mail Transfer Protocol (SMTP) mail server in an embodiment.

A map element 312 may be used to transform data from one format to another. For example, a map element 312 in an embodiment may be used to convert a character to uppercase, change the format of a date or look up a value in a database. A transform map element 314 in an embodiment may associate a first data set field name for a data set field value being retrieved from a first application or source with a second data set field name under which that data set field value will be stored at a second application or destination. The stop element 316 in an embodiment may operate to terminate the integration process.

The integration application management system in an embodiment may associate each of the visual elements within the integration process-modeling graphical user interface with a set of code instructions written in a machine-readable, executable format. For example, the integration application management system in an embodiment may associate the start element 302 with a connector code set, written in a human-readable, machine-executable code language (e.g., JSON or XML), that includes code instructions for accessing a data set field value associated with a user-specified data set field name defined within the start element 302. In other aspects of an embodiment, the data set field name may be defined within the start element 302 in such an embodiment through execution of a software query, written in a specific query syntax or language (e.g., SQL or NoSQL) by the integration process user matching system. Upon generation and storage within a memory of each of the code sets associated with each of the visual elements within the integration process-modeling graphical user interface 300 in an embodiment, the integration application management system may further generate a runtime engine capable of executing each of these code sets. The integration application management system in an embodiment may transmit the runtime engine and each of the code sets for execution of the integration process modeled by the user via the integration process-modeling graphical user interface for execution of the integration process at a remote location (e.g., behind the firewall of a user's enterprise system/network).

In such a way, users of the integration process modeling GUI 300 may customize their integration processes by modeling them with these visual elements. Such a modeling process may negate a need for the user to learn the underlying computer language in which the integration process code instructions are actually written. Further, the ways in which each business customizes their individual integration processes using these visual elements and the integration process modeling GUI 300 may provide information useful in understanding, anticipating, and addressing these businesses' needs. For example, a business may customize its integration processes to rely heavily on a mapping visual element to track a multitude of different names that the business' trading partners use to describe a single type of data (e.g., "diagnosis," "ICD-9," "ICD9," "med_history," "chart," etc., each used to describe medical history of a patient). This heavy reliance on tracking a multitude of names for the same type of data may indicate that business transacts data in an industry that does not require standardization of such data. In such a scenario, it may be helpful to put multiple businesses in this same situation in contact with one another, in order to facilitate communication that may assist in standardizing and thus streamlining each of their businesses.

As another example, a business that does not rely heavily on such a mapping visual element when customizing its integration process may transact data with a limited number of trading partners that tend to use the same or similar naming conventions as the business for the same types of data. This may result in such a business relying less heavily, or not at all, upon use of the mapping visual element during its integration process customization. However, should such a business scale up its business to transact such data among a larger volume of trading partners, the integration process for such transaction may need to be reconfigured to add such mapping elements. Because the use of such mapping elements may be equally helpful in several different industries, two businesses that both rely on such mapping elements may operate in completely different industries, and thus, may not compete directly with one another. In such a scenario, it may be helpful to put this business in the process of scaling up in contact with another business that already heavily relies on such mapping visual elements, in order to facilitate sharing of helpful advice and collaboration between the two.

Thus, a method is needed to identify users of the integration process modeling GUI described above that may benefit by being placed in contact with one another. Embodiments of the present disclosure address this issue by gauging users' preference values for each of the available visual elements these users may use to customize their integration processes, and matching users with similar needs.

Figure 4:
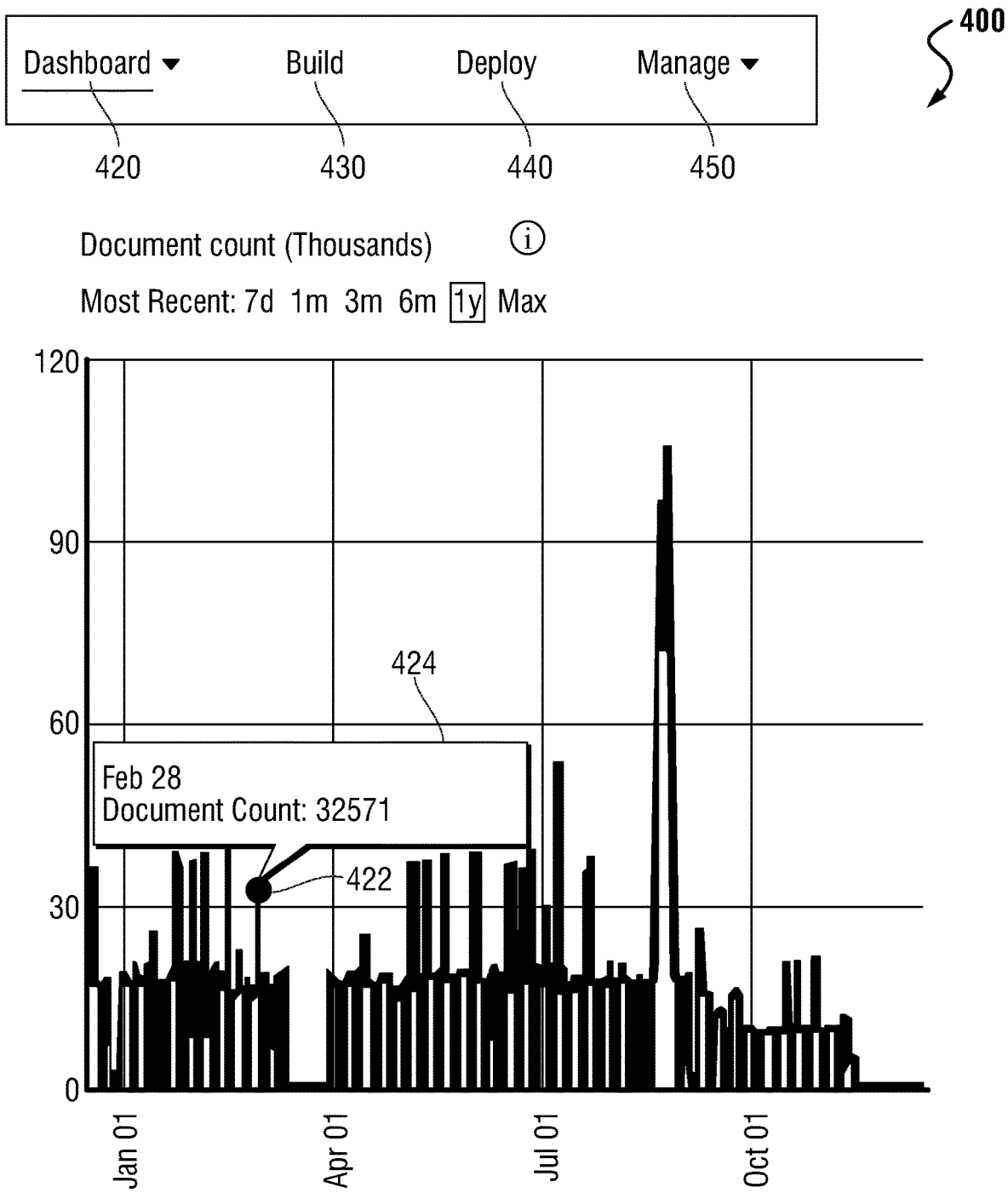
FIG. 4 is a graphical diagram illustrating number of documents transmitted pursuant to executions of a user's integration process according to an embodiment of the present disclosure.

FIG. 4 is a graphical diagram illustrating number of documents transmitted pursuant to executions of a specific user's integration process over time according to an embodiment of the present disclosure. The integration application management system in an embodiment may gather metrics about executed integration processes in an embodiment as a first step in gauging user preferences for each available integration process modeling visual element. For example, following execution of the integration process code sets associated with the visual elements selected by the user in the graphical user interface, the integration application management system in an embodiment may determine the number of documents transmitted or migrated pursuant to that integration process, or across several integration processes. A user may select the dashboard tab 420 to view a plot 400 depicting the number of documents transmitted during each of several executions of the same integration process over a period from January through October. By clicking on a specific point 422 within the plot 400, the user may view a pop-up window 424 describing the exact number of documents executed in a single execution of such an integration process in an embodiment.

The integration application management system in an embodiment may record and store metrics such as the number of documents migrated during each execution of a given integration process, the number of each type of visual element included in the modeling of such an integration process, and the time to completion of each integration process, among other details. Each of these metrics may be gathered from execution logs transmitted to the integration application management system from the remote execution locations of those integration processes (e.g., behind a user's firewalled enterprise system) in an embodiment. In such a way, the integration application management system in an embodiment may gather and store data tracking the types of visual elements employed in each user's executed integration process. Such data may provide a user's positive feedback with respect to a given visual element (e.g., a visual element modeling a portion of an executed integration process), but may fail to capture any negative feedback such a user may have regarding that visual element. In order for the integration process user matching system to place businesses with similar or complimentary needs in contact with one another to mutually beneficial ends, a method is needed to anticipate this unrecorded negative feedback, and more accurately gauge each user's "true" preference for each available visual element.

FIG. 5 is a block diagram illustrating a user/visual element interaction matrix recording, per user, each execution of a given visual element pursuant to an integration process according to an embodiment of the present disclosure. The integration process user matching system in an embodiment may anticipate the unrecorded negative feedback, and thus provide a more accurate gauge of each user's "true" preference for each available visual element, based solely on the positive feedback described above with reference to FIG. 4. Several methods exist to gauge such "true" preferences for a visual element based on limited feedback, mostly involving modeling a user's unrecorded or unknown preferences for a plurality of that visual element's features. For example, a provider managing the integration process modeling GUI may receive positive feedback from a user with respect to a given visual element each time that user executes an integration process modeled using that visual element. Such feedback does not necessarily capture negative feedback such as a user's dissatisfaction with that integration process following its execution, and that user choosing to employ a different visual element in the next integration process execution. Such a choice to switch visual elements may be due to minor variations in the way the process represented by each visual element works. For example, a user may be dissatisfied with an HTTP connector visual element operating to transfer data using the hypertext transfer protocol (HTTP) via websites because it resulted in a slower than anticipated execution. In such a scenario, the same user may choose to replace the HTTP connector visual element with a File Transfer Protocol (FTP) connector visual element for the next integration process execution in order to hopefully decrease the time to completion.

The service provider managing the integration process modeling GUI may not receive any negative feedback regarding the use of the HTTP connector visual element from this user, thus inhibiting the service provider's ability to accurately gauge user preference for the HTTP connector visual element or to provide alternatives to this visual element that users may prefer. For example, none of the interactions between the user and the integration process modeling GUI may clearly indicate the user's preference for transferring data via the FTP protocol rather than the HTTP protocol. Several methods have been developed in other industries in order to model user preference, such as the online retail industry, social media applications, news outlet applications, and dating applications. Because users in each of these industries, as well as the integration process industry make decisions based on many underlying considerations, these methods attempt to model user's preference for each of these underlying considerations. For example, a user choosing between two different sets of wireless headphones offered for sale via an online retailer may consider several features of each of these headphones, including battery life, availability of a warranty, technical support, noise cancelling capabilities, size of earphones, popularity and price. Other users may decide between the same set of headphones based on other or additional features, or may prioritize these features differently.

Similarly, users of the integration process modeling GUI may choose between two different visual elements based on underlying considerations such as the time it takes to complete the modeled process, difficulty level for customizing a visual element to that user's needs, overall complexity of the full integration process including all visual elements, frequency of failed or aborted integration processes modeled using that visual element, etc. These are only a few of such underlying considerations, and much like the online retail example described above, each user may have different underlying considerations, and may prioritize them differently.

In both of these example scenarios, the online retailer or the service provider of the integration process modeling GUI may not know or have any way of determining which underlying considerations each of its users takes into account when choosing an item or a visual element, nor the priority that user places on any given underlying considerations. These underlying considerations may thus be referred to herein as "latent features" of a visual element, because they represent or model the user's preference for an unknown characteristic of any given visual element. As described herein, the service provider of the integration process modeling GUI may not have any way of determining the number or identity of each of these latent features for any given user. Even the user may not consciously identify these latent features when deciding which visual element to select, but may still subconsciously consider such features. Thus, a method of modeling a user's preference for these latent features based only on gathered positive feedback in the form of executed processes modeled using any given visual element is needed.

Matrix factorization and deep learning via a neural network may provide such a method of modeling a user's preferences for these latent features. Such a method may overcome this inability of the integration process modeling GUI service provider to determine the number or identity of such latent features. Identifying each of the latent features or underlying considerations upon which a user bases her decisions (e.g., which visual element to use to model an integration process) involves several unknown variables. The matrix factorization method may be used to decrease the number of variables required to determine a user's true preferences (including consideration of latent features) that are unknown.

Such a method may begin by generating a user/visual element interaction matrix that records all of the measured positive feedback gathered by the service provider for the integration process modeling GUI for a given time period. The integration process user matching system in an embodiment may access metrics gathered and stored by the integration application management system describing the types of visual elements employed in each user's executed integration processes to generate a user/visual element interaction matrix. For example, the integration process user matching system in an embodiment may generate a user/visual element interaction matrix 500 having a plurality of rows 510, each describing a user of an integration process, and columns 520, each describing a type of integration process visual element. More specifically, the user/visual element interaction matrix 500 may include a column for the HTTP connector visual element, the disk connector visual element, the FTP connector visual element, the mail connector visual element, the transform map visual element, and the map visual element in an example embodiment.

In some embodiments, the user/visual element interaction matrix may further include columns tracking metrics other than the type of visual element employed in a user's executed integration process. For example, the user/visual element interaction matrix 500 may include a column describing the number of fields within a JSON or XML array sent or received pursuant to an executed integration process. Each cell of the user/visual element interaction matrix 500 in an embodiment may include a value indicating the number of times a specific type of visual element was executed in a specific user's integration process. For example, the top-left cell of matrix 500 indicates that the integration process modeled and executed by user A included 16 HTTP connector visual elements. Because the user/visual element interaction matrix 500 records the number of executions performed, each of the cells within the matrix 500 include only positive, whole numbers. The matrix 500 does not record executions not performed successfully or aborted prior to completion. Similarly, the matrix 500 does not record choices made by a given user to not employ a visual element within a given integration process. Thus, the matrix 500 captures positive feedback from users (e.g., affirmative choices to execute integration processes included certain visual elements), but does not capture negative feedback from users (e.g., failed integration process executions, or choices not to use certain visual elements within an integration process).

The columns shown in FIG. 5 are only a few examples of the types of visual elements that may be employed within an executed integration process in an embodiment. Further, the columns shown in FIG. 5 are only a few examples of the metrics that may be collected from execution logs and associated with specific users to describe user's preferences for certain integration processes. Other embodiments may include information describing the number of documents or datasets transmitted or received, or more in-depth information describing the datasets transmitted or received. For example, the user/visual element interaction matrix 500 in some embodiments may further include columns for specific dataset field names (e.g., "ICD9," "employee_ID," "balance") transmitted or received during executed integration processes. Certain dataset field names may be specific to certain industries or to specific business divisions within a company. For example, "employee_ID" may be specific to the human resources division, "balance" may be specific to the finance industry, or "ICD9" may refer to diagnosis codes used primarily by medical and health insurance companies. By tracking such widely used dataset field names in an embodiment, the integration process matching system may gather information that can be indirectly used to match users executing similar processes within the same industry or within the same business divisions within separate industries to one another.

FIG. 6 is a block diagram illustrating user and integration process visual elements embedding matrices and a latent feature user preference sparse matrix according to an embodiment of the present disclosure. These matrices may be decomposed from a user/visual element interaction matrix in an embodiment. As described herein, the user/visual element interaction matrix captures positive feedback from users but does not capture negative feedback from users. As such, any negative feedback from a user may be a latent feature contributing to preferences for or against certain visual elements and their associated subprocesses. An example of a latent feature driving user preference may be complexity of setting up the visual element within the graphical user interface, or likelihood that the subprocess associated with that visual element may execute incompletely or erroneously. These types of problems may not be recorded directly, and thus, may be a latent driving force behind user choice for a given visual element. The user preference embedding matrix 612 and visual elements embedding matrix 622 in an embodiment may be generated in order to capture some of these latent features that are otherwise unknown or unrecorded.

As also described herein, identifying each of the latent features or underlying considerations upon which a user bases her decisions (e.g., which visual element to use to model an integration process) involves several unknown variables. The matrix factorization method may be used to decrease the number of variables required to determine a user's true preferences (including consideration of latent features) that are unknown. Such a matrix factorization method may involve generating three new matrices that are interrelated according to preset requirements, based on the user/visual element interaction matrix. By applying these preset requirements, the number of unknown variables may be decreased.

The integration process user matching system in an embodiment may employ a matrix factorization method to decompose the user/visual element interaction matrix described with reference to FIG. 5 into a user preference embedding matrix 612, a visual element embedding matrix 622, and a latent features sparse matrix 632, based on a preset latent features value. The user preference embedding matrix 612 in such an embodiment may model a user's (unrecorded) preference for latent features of each visual element, and the visual element embedding matrix 622 may model the impact each of these latent features has on each visual element.

The step of generating these two embedding matrices (e.g., 612 and 622), by itself, does not decrease the number of unknowns. However, a further step defining the relationships between each of the cells within these matrices may do just that. For example, such a method may also involve generating the latent features sparse matrix 632 such that it is the dot product of the user preference embedding matrix and the visual elements embedding matrix. A specific matrix decomposition method called a singular value decomposition method may generate the user preference embedding matrix 612 and the visual element embedding matrix 622 by requiring the latent features sparse matrix 632 (e.g., a dot product of matrix 612 and matrix 622) to have non-zero values only in the cells that are oriented diagonally across the latent features sparse matrix 632. In other words, most of the values within this latent features sparse matrix 632 are set to zero, and thus are known, decreasing the number of unknown variables used to determine the values in the user preference embedding matrix 612 and the visual element embedding matrix 622. This type of matrix is referred to herein as a "sparse" matrix, because the number of non-zero values is "sparse" in comparison to the number of cells holding a value of zero. Many singular value decomposition methods exist in the art (e.g., within the coding language Python), and require only the input of the user/visual element interaction matrix (e.g., in an embodiment described with reference to FIG. 5), and a set number of latent features to consider.

The latent features value in an embodiment may represent the number of latent features assumed to apply to each of the sub-processes associated with visual elements, and thus, the number of latent features each user may endorse or dislike. Because these latent features are unknown, the latent features value may be preset and adjusted in order to increase accuracy of the matrix factorization method. As the latent features value increases or decreases in an embodiment, the size (e.g., number of columns and rows) of each of the user preference embedding matrix 612, visual element embedding matrix 622, and latent feature sparse matrix 632 may increase or decrease.

The integration process user matching system in an embodiment may decompose several user/visual element interaction matrices (e.g., as described with reference to FIG. 5) generated over time into several groups of user preference embedding matrices, visual elements embedding matrices, and latent feature sparse matrices. For example, the integration process user matching system may generate a user/visual element interaction matrix describing all integration processes executed once per week over a year. In such an example, the integration process user matching system may generate, for each of those weeks, a user preference embedding matrix 612, a visual elements embedding matrix 622, and a latent feature sparse matrix 632.

The latent feature sparse matrix 632 in an embodiment may include only positive numbers or zeroes within each cell. Further, the positive numbers within the latent feature sparse matrix 632 in an embodiment may fall along a diagonal path from the top-left cell to the bottom-right cell. In addition, the values within each cell of each of these matrices 612, 622, and 632 may also increase or decrease. These features of the latent feature sparse matrix 632 may be a result of the decomposition method used to generate the user preference embedding matrix 612 and the visual elements embedding matrix 622. A quick reference for gauging the magnitude or contents of the latent feature sparse matrix 632 in an embodiment may include determining the root mean square error for the latent features sparse matrix 632. By comparing the root mean square error for two separate latent feature sparse matrices (e.g., 632) in an embodiment, the integration process user matching system may determine the degree to which the two latent feature sparse matrices (e.g., 632) (and implicitly their corresponding user preference embedding matrix 612 and visual element embedding matrix 622) are similar or similarly model a user's preferences.

Upon generation of the user preference embedding matrix 612 and the visual element embedding matrix 622 using such a singular value decomposition method, a user's "true" preference for any given visual element, taking into account a user's preference for unknown latent features may be determined. For example, such a "true" preference may be determined by taking a dot product of the row within the user preference embedding matrix associated with that user and the column within the visual element embedding matrix associated with a given visual element. A dot product may be determined by multiplying each cell within the row by each cell within the column, then adding all of these products together, to give a user's "true" preference for a given visual element. For example, user A's latent features preference value for the HTTP connector visual element may be determined by taking a dot product of each of the values in the top row of the user preference embedding matrix 612 and each of the values in the left-most column of the visual elements embedding matrix 622.

Figure 7:
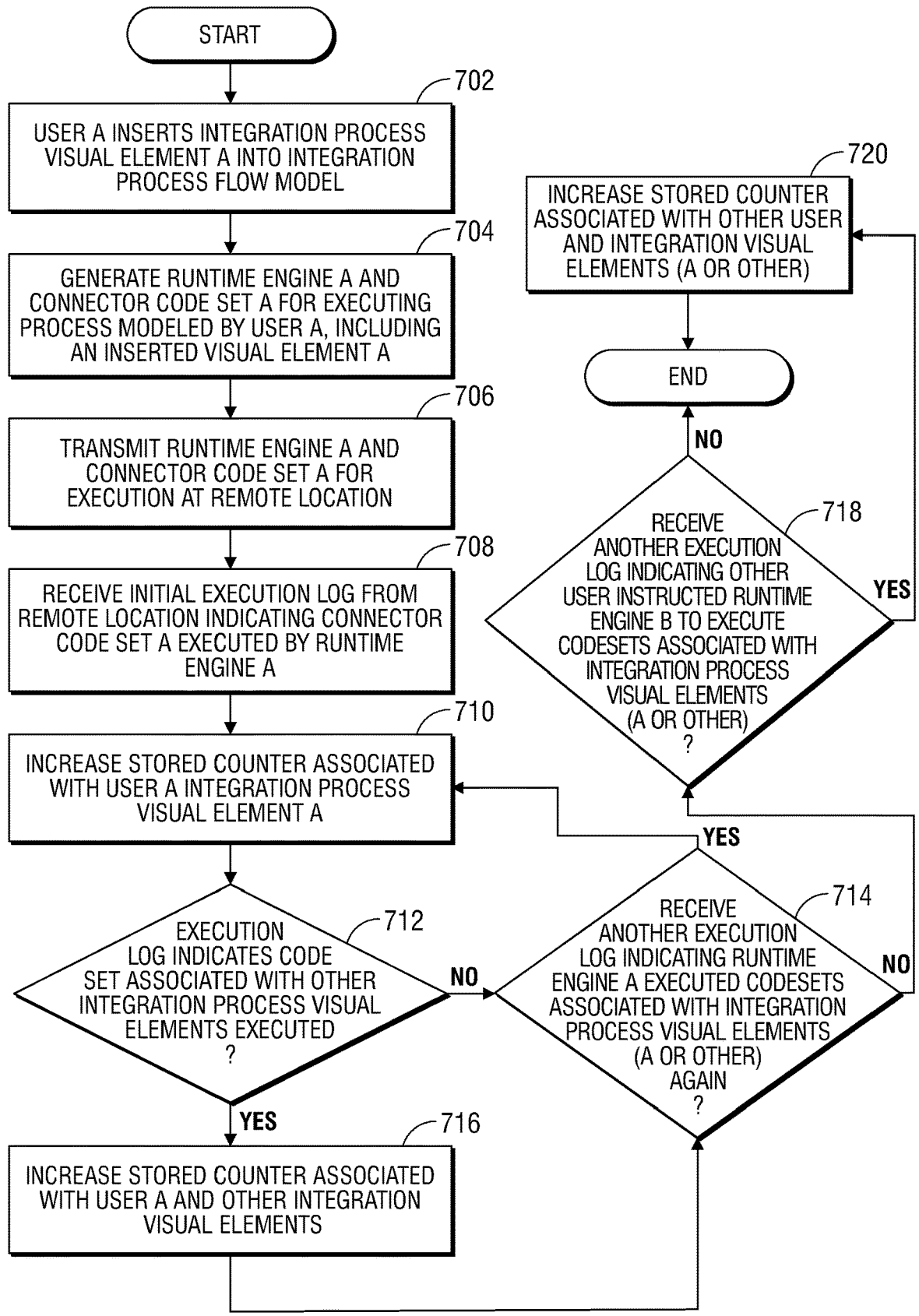
FIG. 7 is a flow diagram illustrating a method of tracking executions of integration process visual elements according to an embodiment of the present disclosure.

FIG. 7 is a flow diagram illustrating a method of tracking user feedback such as executions of integration process visual elements on a per user basis over time according to an embodiment of the present disclosure. As described herein, the integration application management system in an embodiment may gather metrics about executed integration processes in order to generate a user/visual interaction matrix describing each instance in which a given user executes a code set associated with a given visual element. Other embodiments may include user feedback other than previous executions of integration processes modeled using visual elements. For example, such other user feedback may include number of documents transacted during an executed integration process, or time to completion of such an integration process. This system serves to provide high level user preferences that may be used as a basis to identify such user's needs with respect to integration process management. The integration process user matching system in an embodiment may refine these high level user preferences, identify users with similar or complimentary needs, and place them in contact with one another, to each user's mutual benefit.

At block 702, a first user (User A) may insert a first integration process visual element (visual element A) into the integration process flow model via the graphical user interface in an embodiment. For example, in an embodiment described with reference to FIG. 3, a user may use the graphical user interface 300 to insert an HTTP connector visual element 304 into a modeled integration process flow. In other examples, a user may insert a disk connector visual element 306, an FTP connector visual element 308, a mail connector visual element 310, a map visual element 312, or a transform map visual element 314 into a process flow. In still other examples, other users may generate other process flows (not shown) using the same or other visual elements.

The integration application management system in an embodiment may generate a first runtime engine (runtime engine A) and a first connector code set (code set A) for execution of the process modeled by user A. This may include an inserted visual element A at block 704. For example, in an embodiment described with reference to FIG. 2, the integration application management system operating at the service provider system/server 212 may receive the user selection of one or more visual elements via the graphical user interface hosted by the service provider system/server 212 and accessed by the user device 202 via network 120. In such an embodiment, the service provider system/server 212 may generate a code set associated with each user selected visual element, as well as a runtime engine for executing that code set. For example, the user device 202 may transmit an instruction to the service provider system/server 212 to insert an HTTP connector visual element and a map visual element into a process flow, and the service provider system/server 212 may generate a code set associated with the HTTP connector visual element and a code set associated with the map visual element. The service provider system/server 212 in such an embodiment may also generate a runtime engine for execution of both of these code sets within a single integration process.

At block 706 in an embodiment, the integration application management system may transmit the runtime engine A and connector code set A for execution at a remote location. The service provider system/server 212 in such an embodiment may transmit the runtime engine and all code sets generated at block 704 in an embodiment to the enterprise system/network 214 for execution at the enterprise system/network 214. Upon receiving the runtime engine and code sets in such an embodiment, the runtime engine may execute these code sets at the enterprise system/network 214 any number of times, repeatedly. The service provider server/system 212 in an embodiment may similarly generate and transmit code sets and runtime engines for execution at other enterprise system/networks (not shown) by other users.

The integration application management system in an embodiment may receive an initial execution log from the remote location indicating the connector code set A has been executed by runtime engine A at block 708. For example, in an embodiment described with reference to FIG. 2, the runtime engine may operate to execute at the enterprise system/network 214 one or more of the code sets associated with the HTTP connector visual element and the map visual element generated at block 704, and to transmit an execution log recording such execution back to the service provider server/system 212. Such an execution log may be generated and transmitted back to the service provider server/system 212 in an embodiment each time the runtime engine is executed at the enterprise system/network 214. Further, each execution log may record each code set executed, as well as time of execution. In some embodiments, the execution log may further include information describing the type of datasets migrated during execution, including, for example, dataset field names (e.g., "ICD9," "Employee_ID," or "balance").

The service provider system/server 212 in an embodiment may thus receive multiple execution logs from the same user indicating repeated execution of a single integration process or indicating separate executions of different integration processes by the same user. Further, the service provider system/server 212 in an embodiment may also receive executions logs from other users, indicating code sets associated with various visual elements executed by a plurality of users over time.

At block 710, the integration process user matching system in an embodiment may increase a stored counter associated with user A and integration process visual element A within the user/visual element interaction matrix. For example, the integration application management system in an embodiment may have received an execution log at block 708 indicating user A has executed an integration process including a code set associated with the HTTP connector visual element. The integration process user matching system in such an embodiment may increase the stored counter associated with user A and the HTTP connector visual element within the user/visual element interaction matrix. For example, in an embodiment described with reference to FIG. 5, the integration process user matching system may increase the value in the top-left cell of the user/visual element interaction matrix 500 associated with user A and HTTP connector from "16" to "17." In other embodiments in which a user/visual element interaction matrix 500 has not yet been created, the integration process user matching system may generate the matrix 500, then set the value in the top-left cell of the user/visual element interaction matrix 500 associated with user A and HTTP connector to "1." In such a way, the integration process user matching system in an embodiment may create or update the user/visual element interaction matrix to reflect a user execution or endorsement of a code set associated with a given visual element.

The integration process user matching system in an embodiment may determine at block 712 whether the received execution log indicates a code set associated with a second integration process visual element (visual element B) has been executed. For example, the integration process user matching system in an embodiment may determine whether the execution log received from user A that showed execution of a code set associated with the HTTP connector visual element also shows execution of code sets associated with other visual elements. If the execution log does not indicate code set B associated with visual element B has been executed, the process may proceed to block 714 to determine whether other execution logs reflect later executions of code set A by user A. If the execution log indicates a second code set (code set B) associated with the second integration process visual element (visual element B) has been executed, the process may proceed to block 716 to adjust the user/visual element interaction matrix accordingly.

In an embodiment in which a received execution log indicates user A has not executed code sets other than code set A, the integration process user matching system in an embodiment may determine at block 714 whether other execution logs have been received from user A indicating repeated executions of code set A by user A. For example, the integration process user matching system in an embodiment may determine the execution log received at block 708 reflects only one code set associated with the HTTP connector visual element was executed. In such an embodiment, the integration process user matching system may identify other execution logs received from user A indicating other executions of the same integration process. As described herein, the service provider system/server in an embodiment may receive multiple execution logs from the same user indicating repeated execution of a single integration process or indicating separate executions of different integration processes by the same user. If another execution log has been received from user A, indicating user A has executed code set A associated with visual element A again, the process may proceed back to block 710 to increase the counter associated with user A and visual element A and to check the execution log for executions of other code sets. By performing the loop including blocks 710, 712, and 714, the integration process user matching system in an embodiment may update the user/visual element interaction matrix to record each instance in which a single user (user A) executes a process including a single visual element (visual element A). If no other execution log has been received from user A, the method may proceed to block 718 to determine whether execution logs have been received indicating other users (e.g., user B) have executed integration processes including code set A.

At block 716, the integration process user matching system in an embodiment in which the execution log indicates user A executed code set B may increase the stored counter associated with user A and visual element B within the user/visual element interaction matrix. For example, the integration process user matching system in an embodiment may determine the execution log received from user A at block 708 that showed execution of a code set associated with the HTTP connector visual element also shows execution of a code set associated with the map visual element. In such an example embodiment described with reference to FIG. 5, the integration process user matching system may increase the value in the top row of the user/visual element interaction matrix 500 associated with user A and with the map visual element from "2058" to "2059."

In other embodiments, in which a user/visual element interaction matrix 500 or an entry has not yet been created, the integration process user matching system may generate the matrix 500 or establish a new entry, then set the value in the top row of the user/visual element interaction matrix 500 associated with user A and the map visual element to "1." In still other embodiments, in which the integration process user matching system identifies several code sets associated with several visual elements that have been executed, as reflected in the execution log, the integration process user matching system may adjust each of the values of the cells in the top row associated with those several visual elements to reflect those executions. In such a way, the integration process user matching system in an embodiment may create or update the user/visual element interaction matrix to reflect a user execution or endorsement of each of several code set associated with several visual elements, to fill out or update each of the cells in the row associated with user A within the user/visual element interaction matrix. The method may then proceed back to block 714 to determine whether other execution logs reflect later executions of code set A by user A. By performing the loop including block 710, 712, 714, and 716, the integration process user matching system in an embodiment may update the user/visual element interaction matrix to record each instance in which a single user (user A) executes each of multiple visual elements (e.g., visual elements A, B, or any additional visual elements or other user feedback information such as number of documents transacted).

At block 718, the integration process user matching system in an embodiment in which the user/visual element interaction matrix has been updated to reflect each of multiple executions by user A of code sets associated with one or more visual elements (e.g., visual elements A or B) may determine whether executions logs have been received by a second user (user B) indicating the second user executed the first code set (code set A) associated with the first visual element (visual element A). As described herein in an embodiment with reference to FIG. 2, the service provider system/server 212 may receive executions logs from other users, indicating code sets associated with various visual elements executed by a plurality of users over time. If an execution log has been received by user B indicating user B executed code set A associated with visual element A, the method may proceed to block 720 to adjust the counter associated with user B and visual element A within the user/visual element interaction matrix. If an execution log indicating user B has executed code set A has not been received, there may be no need to further update the user/visual element interaction matrix (e.g., because it already contains all information for other users), and the method may end. It is understood this may be repeated for plural execution logs received from any number of users identified within the user/visual element interaction matrix 500.

At block 720, in an embodiment in which another execution log has been received reflecting execution by user B of code set A, the counter associated with user B and code set A within the user/visual element interaction matrix may be increased. For example, the integration process user matching system in an embodiment may determine an execution log received from user B indicates execution of a code set associated with the HTTP connector visual element. In such an example embodiment described with reference to FIG. 5, the integration process user matching system may increase the value of the second to top cell in the left-most column of the user/visual element interaction matrix 500 associated with user B and the HTTP connector visual element from "62" to "63."

In other embodiments in which a user/visual element interaction matrix 500 or an entry has not yet been created, the integration process user matching system may generate the matrix 500 or a new entry in matrix 500, then set the value in the second to top row of the user/visual element interaction matrix 500 associated with user A and the HTTP connector visual element to "1." In still other embodiments, in which the integration process user matching system identifies several code sets associated with several visual elements that have been executed by user B or other users, as reflected in the execution log, the integration process user matching system may adjust each of the values of the cells in second to the top row associated with those several visual elements to reflect those executions, to fill out or update each of the cells in the row associated with user B within the user/visual element interaction matrix. This process may be repeated for each of the users associated with a row within the user/visual element interaction matrix until the entire user/visual element matrix has been filled out or updated. In such a way, the integration process user matching system in an embodiment may create or update the user/visual element interaction matrix to reflect each of a plurality of user's executions or endorsements of each of several code set associated with several visual elements using the user/visual element interaction matrix 500. The method may then end. By performing the blocks of FIG. 7 for each user (or each received execution log) in an embodiment, a user/visual element interaction matrix reflecting each execution of a code set associated with a specific visual element by a specific user over a preset time period may be generated.

Figure 8:
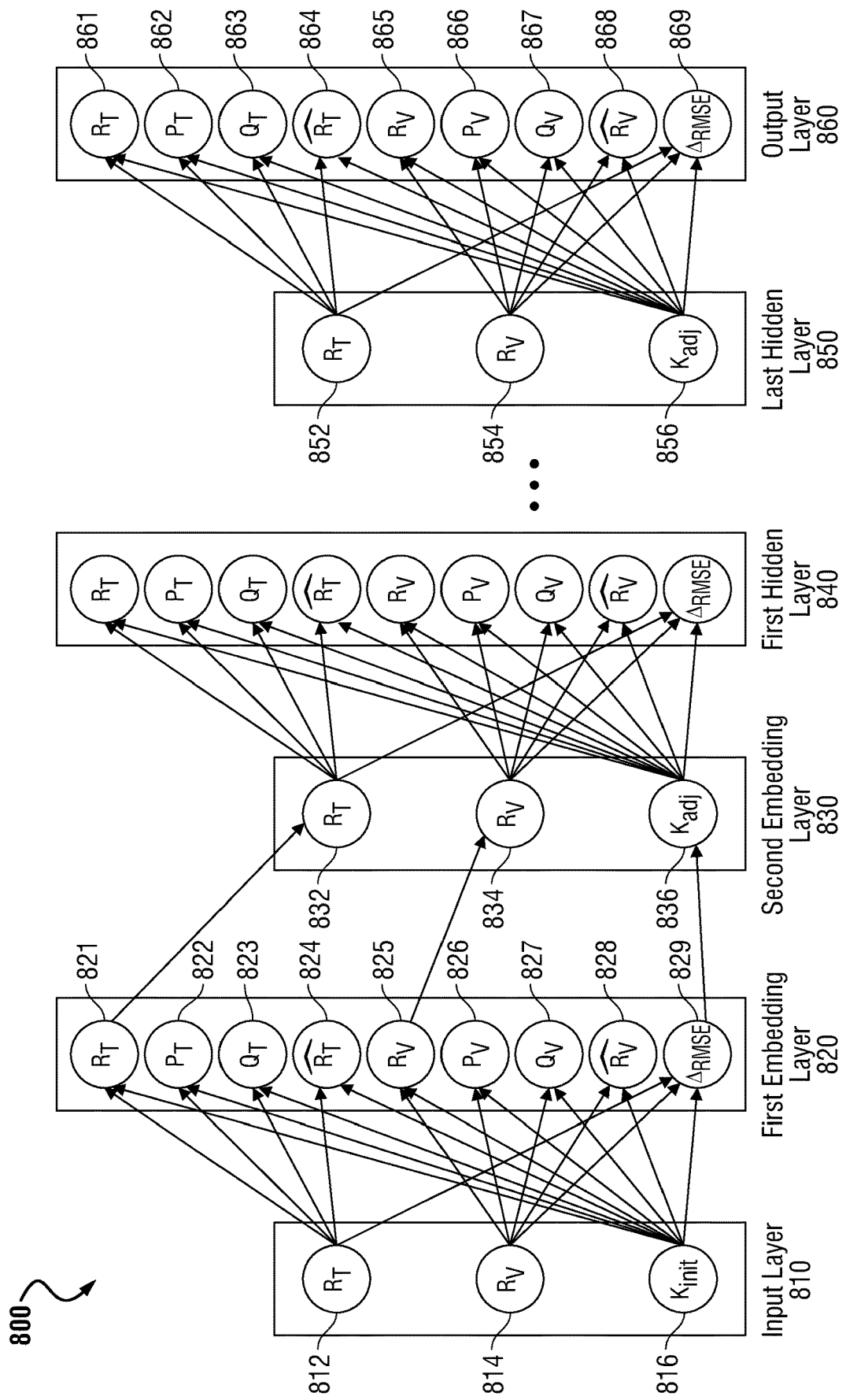
FIG. 8 is a block diagram illustrating a multi-layered neural network for generating user preference and visual element embedding matrices according to an embodiment of the present disclosure.

FIG. 8 is a block diagram illustrating a multi-layered neural network for generating user preference and visual element embedding matrices using a learned, optimal latent features value according to an embodiment of the present disclosure. As described herein, the integration process user matching system in an embodiment may employ a matrix factorization method to decompose the user/visual element interaction matrix into a user preference embedding matrix that models a user's (unrecorded) preference for latent features of each visual element, and a visual element embedding matrix that models the impact each of these latent features has on each visual element. The latent features value may represent the number of latent features assumed to apply to each of the sub-processes, and thus, the number of latent features each user may endorse or dislike.

As also described herein, the number of latent features to consider cannot be measured, and thus, the setting of such a number when initiating a singular value decomposition method may comprise a guess or estimate. The values within each cell of the user preference embedding matrix and the visual element embedding matrix (and consequently a user's "true" preference for any given visual element) will vary as the preset number of latent features varies. In other words, in order to accurately determine or model a user's "true" preference for a given visual element for modeling an integration process, a service provider for the integration process modeling GUI may need to identify an optimal preset number of latent features used to generate the user preference embedding matrix and the visual element embedding matrix.

An optimal number of latent features results in a most accurate prediction of a user's true preference for a visual element. Considering too few or too many latent features may result in inaccurate predictions. For example, one issue common to such prediction methods is called "overfit," and is caused when too many latent features are considered. In such a scenario, the resulting prediction of a user's preference for a visual element is very close or exactly identical to the known positive feedback. In the real-world context, this results in under consideration of a user's unrecorded negative feedback, and an artificially inflated gauge of effectiveness of a given visual element in meeting a user's needs. It also fails to provide the information needed, in order for the service provider of the integration process modeling GUI to place users with similar needs in contact with one another. Thus, a method is needed to identify and apply an optimal number of latent features during the matrix decomposition. The number of latent features may be represented by the symbol k herein. In other words, the number of latent features (k) is a whole, non-zero number value, and is equivalent to the number of columns in the user preference embedding matrix and the number of rows in the visual element embedding matrix.

The integration process user matching system in embodiments described herein may address this issue by using a multi-layered neural network and deep learning approach to identify an optimal number of latent features (k), and thus, more accurately gauge users' preferences for a variety of visual elements. In an embodiment, a neural network 800 may be trained to determine an optimal latent features value to produce the most accurate user preference embedding matrix and visual element embedding matrix. In doing so, the neural network may compare user preference and visual element embedding matrices modeled based on a validation set of data (e.g., a most-recently generated user/visual element interaction matrix) with user preference and visual element embedding matrices modeled based on a test set of data (e.g., an earlier generated user/visual element interaction matrix). This may occur during a training session for the neural network in which the integration process user matching system may train the neural network to identify an optimal user preference value (k). Once the neural network is trained, the neural network may apply the optimal user preference value (k) to generate a most accurate user preference embedding matrix and a most accurate visual element embedding matrix based on any newly input user/visual element interaction matrices. A dot product of these two embedding matrices may then be determined in order to identify each user's "true" preference for any given visual element, and to place matching user's with the same or complimentary preferences in contact with one another.

The neural network 800 may include several layers, including an input layer 810, a first embedding layer 820, a second embedding layer 830, several hidden layers (e.g., including 840 and 850), and an output layer 860 in an embodiment. It is understood any number of layers may be used in various embodiments. In the output layer, one or more node values may be compared against a value known to be correct or true. During training of the neural network, the values generated within the output layer may differ from the known correct value by some degree, described herein as the "error function" of the neural network. The goal of such a training session may be to decrease this "error function" until the neural network is capable of outputting values very close or identical to the known correct value.

The value of nodes within each hidden layer and the output layer in an embodiment may depend upon the value of one or more nodes in the previous layer. Each node within each layer of a neural network in an embodiment may be associated with several weights that each describes the degree to which a node within a given layer depends upon a value of a node within the previous layer. For example, if a first layer of a neural network includes four nodes and the second layer includes four nodes that are all dependent upon each of the nodes in the first layer, each node within the second layer may be associated with four different weights (e.g., one weight for each of the nodes within the first layer upon which the node in the second layer depends). In total, the second layer in such a scenario may include 16 weights (e.g., four weights for each of four nodes in the second layer). These 16 weights may be combined to form a weight matrix in an embodiment. Each layer of a neural network may then be associated with a different weight matrix that describes the degree to which the values of each node of a given layer depend upon the values of each node in the previous layer.

These weight matrices may be unique to the architecture and functionality of the neural network in an embodiment, and may not directly describe any aspect of the user/visual element interaction matrices, user preference embedding matrices, visual element embedding matrices, or latent features sparse matrices also described herein. During a training session, these weight matrices may be incorrect, which would result in an incorrect output value (e.g., the output value compared against the known, correct value, as described directly above). Thus, the degree to which the output value during a training session differs from the known correct value may reflect the degree to which the weight matrices of the multiple layers of the neural network are incorrect and need to be adjusted.

To address this issue, the error function determined by comparing the output value generated during a training session and the known, correct value may be back propagated through the neural network, to adjust the weight matrices associated with each layer. Such a back propagation method may operate to adjust the values of the weight matrices associated with each of the layers. The neural network may then forward propagate the same input nodes that were used previously (e.g., to generate the output value that differed from the known, correct value by the error function), but apply these adjusted weight matrices to produce different values at each node of each layer. Thus, this forward propagation may produce a different value at the output node than was previously produced. This new output node value may then be compared against the known, correct value again, to determine if they are sufficiently similar to one another to indicate the neural network is fully trained. Such a back propagation and forward propagation may be repeated serially until the output value of the neural network falls within a preset threshold tolerance of the known, correct value. At that point, the neural network may be said to be trained to produce correct outputs based on any given input.

The layers of the neural network 800 in an embodiment may be grouped into repeated pairs, whereby the first layer of the pair sets or adjusts the latent features value k, and the second layer of the pair performs matrix factorization of the user/visual element interaction matrices based on the set or adjusted latent features value k from the first layer of the pair. The second layer of each pair may also produce a rough gauge of the difference between the matrix factorization performed on the test set and the matrix factorization performed on the validation set, $\Delta_{RMSE}$. This rough gauge in an embodiment may inform the degree to which the latent features value k should be adjusted for the next iteration of matrix factorization, because an optimal latent features value $k_{OPT}$ effectively minimizes this roughly gauged difference $\Delta_{RMSE}$.

The integration process user matching system in an embodiment may iteratively perform this adjustment to identify a latent features value k that minimizes the differences between a test set and a validation set of data. For example, multiple sets of test data may be used to generate multiple user/visual element interaction matrices $R_T$. More specifically, the integration process user management system in an example embodiment may gather execution logs daily over a one-month period, from a plurality of users. The integration process user management system in such an embodiment may then generate one user/visual element interaction matrix to describe all data gathered on any individual day of that month, giving total of 30 user/visual element interaction matrices in an example embodiment. The most recent of these 30 user/visual element interaction matrices (e.g., generated based on execution logs received on the last day of the month) may be labeled as the validation user/visual element interaction matrix $R_V$ associated with node 814 in the input layer 810. It is understood that any set of user/visual element interaction matrices maybe labeled the validation user/visual element interaction matrix $R_V$ while the remaining sets are test data. For example, the remaining 29 user/visual element interaction matrices (e.g., generated based on execution logs received every day prior to the last day of the month) may be labeled as test user/visual element interaction matrices. To begin a training session for the neural network 800, one of the test user/visual element interaction matrices (e.g., a test user/visual element interaction matrix generated based on execution logs received on the first day of the month, for example) may be input as $R_T$ at node 812 in the input layer 810.

Each layer in the neural network 800 may include a plurality of nodes, each representing a single value, or a plurality of values. For example, the input layer 810 may include node 812, which may represent a test set user/visual element interaction matrix $R_T$. This test set user/visual element interaction matrix may be one of several test set user/visual element interaction matrices generated based on previously gathered execution logs, as described directly above. The input layer 810 may also include node 814 representing a validation set user/visual element interaction matrix $R_V$, which may be generated based on more recently gathered execution logs, as also described directly above. A node 816 representing a latent features value k that may be used to generate embedding matrices within the embedding layer 820 may also be included within the input layer 810 in an embodiment. As described herein, in order to accurately determine or model a user's "true" preference for a given visual element for modeling an integration process, a service provider for the integration process modeling GUI may need to identify an optimal preset number of latent features (k) used to generate the user preference embedding matrix and the visual element embedding matrix. Any whole number value may be assigned as the latent features value $k_{init}$ in an embodiment. For example, in some embodiments, the latent features value $k_{init}$ associated with node 816 may have a value between 20 and 100. In some embodiments, each of the values within the test set user/visual element interaction matrix $R_T$ or the validation set user/visual element interaction matrix $R_V$ may be represented by separate nodes within the input layer 810.

The neural network may also include a first embedding layer 820 representing the step of matrix factorization of the user/visual element interaction matrices input into the input layer 810, using the initial preset (or estimated) latent features value $k_{init}$ from the input layer 810. For example, the embedding layer 820 may include a node 821 representing the test user/visual element interaction matrix $R_T$, node 822 representing the test user preference embedding matrix $P_T$, node 823 representing the test visual element embedding matrix $Q_T$, and node 824 representing the test latent features sparse matrix $\widehat{R_T}$. The test user/visual element interaction matrix $R_T$ at node 821 in an embodiment may represent the recorded positive feedback within a test set of data of several users with respect to several visual elements, as described in greater detail with respect to FIG. 5. The test user preference embedding matrix $P_T$ at node 822, test visual element embedding matrix $Q_T$ at node 823, and test latent features sparse matrix $\widehat{R_T}$ at node 824 in an embodiment may represent the matrices generated by decomposing the test user/visual element interaction matrix $R_T$ at node 812 (e.g., using a singular value decomposition method), based on the initial latent features value $k_{init}$ at node 816, as described in greater detail with respect to FIG. 6.

As another example, the first embedding layer 820 may include a node 825 representing the validation user/visual element interaction matrix $R_V$, node 826 representing the validation user preference embedding matrix $P_V$, node 827 representing the validation visual element embedding matrix $Q_V$, and node 828 representing the validation latent features sparse matrix $\widehat{R_V}$. The validation user/visual element interaction matrix $R_V$ at node 825 in an embodiment may represent the recorded positive feedback within a validation set of data of several users with respect to several visual elements, as described in greater detail with respect to FIG. 5. The validation user preference embedding matrix $P_V$ at node 826, validation visual element embedding matrix $Q_V$ at node 827, and validation latent features sparse matrix $\widehat{R_V}$ at node 828 in an embodiment may represent the matrices generated by decomposing the validation user/visual element interaction matrix $R_V$ at node 814 (e.g., using a singular value decomposition method), based on the initial latent features value $k_{init}$ at node 816, as described in greater detail with respect to FIG. 6. In some embodiments, each of the values within the test latent features sparse matrix $\widehat{R_T}$, the test user preference embedding matrix $P_T$, the test visual element embedding matrix $Q_T$, the validation latent features sparse matrix $\widehat{R_V}$, the validation user preference embedding matrix $P_V$, and the validation visual element embedding matrix $Q_V$ may be represented by separate nodes within the embedding layer 820.

The first embedding layer 820 may also include a node 829 representing a difference $\Delta_{RMSE}$ between the root mean square error for the test latent features sparse matrix $\widehat{R_T}$ represented by node 824 and the root mean square error for the validation latent features sparse matrix $\widehat{R_V}$ represented at node 828. Comparison of these values for each of the sparse matrices $\widehat{R_T}$ and $\widehat{R_V}$ within the first embedding layer 820 in an embodiment may provide a rough gauge of the similarity between these two matrices. The neural network may be trained to determine an optimal latent features value k by minimizing the differences between the sparse matrices generated based on the test set and the validation set. Thus, the value of $\Delta_{RMSE}$ as determined at node 829 in the first embedding layer 820 may be used to adjust the value of the latent features value k in the following layer using an algorithm for minimizing $\Delta_{RMSE}$. For example, a gradient descent method may be employed to adjust the latent features value k for the second embedding layer 830 based on the value of $\Delta_{RMSE}$ at node 829 of the first embedding layer 820. As described herein, identifying an optimal preset number of latent features (k) used to generate the user preference embedding matrix and the visual element embedding matrix may allow the integration process user matching system to accurately determine or model a user's "true" preference for a given visual element for modeling an integration process.

A second embedding layer 830 of the neural network 800 in an embodiment may include the first layer of the next layer-pair. For example, the second embedding layer 830 may include similar information as that included within the input layer 810, such as, for example, at node 832, the same test user/visual element interaction matrix $R_T$ given at node 812, and at node 834, the same validation user/visual element interaction matrix $R_V$ given at node 814. This may be the case because each layer-pair of the neural network performs the same matrix decomposition method (singular value decomposition, for example) on the same user/visual element interaction matrix (e.g., $R_T$ for the test set of data, and $R_V$ for the validation set of data), but each layer pair employs a different latent features value (k) to perform this decomposition method. For example, as described directly above, the second embedding layer 830 may include node 836 representing an adjusted latent features value $k_{adj}$, which has been determined by adjusting the initial latent features value $k_{init}$ based on the value of $\Delta_{RSME}$ at node 829 in the first embedding layer 820.

The neural network 800 may also include a plurality of hidden layers, including layers 840 and 850. The first hidden layer 840 may form the second layer of a layer pair, and the last hidden layer 850 may form the first layer of a layer pair, as described herein. The neural network 800 may include any number of hidden layers, which may iteratively perform the same process described with reference to the input layer 810, first embedding layer 820, and second embedding layer 830. Namely, each layer pair in these hidden layers may determine a degree of difference between latent feature sparse matrices generated based on the same latent features value, but different user/visual element interaction matrices. This degree of difference may then be used to adjust the latent features value used to generate the latent feature sparse matrices within the next layer pair. The neural network of the integration process user matching system may be modeled using any number of hidden layers, and the nodes in each additional hidden layer may be determined based on the value of the nodes in the previous layer and the weight matrices describing correlations between each of the respective nodes. A greater number of layers within the neural network topology may decrease the likelihood of divergence (yielding unusable results), but may increase processing time.

The neural network of the integration process user matching system may then produce an output layer 860, which may form the second layer within the final layer-pair of the neural network 800 in an embodiment. For example, the output layer 860 may include a node 861 representing the test user/visual element interaction matrix $R_T$, node 862 representing the test user preference embedding matrix $P_T$, node 863 representing the test visual element embedding matrix $Q_T$, and node 864 representing the test latent features sparse matrix $\widehat{R_T}$. Each of the matrices represented by nodes 862, 863, and 864 in an embodiment may be generated by decomposing the test user/visual element interaction matrix $R_T$ at node 852, based on the latent features value $k_{adj}$ at node 856. As another example, the output layer 860 may include a node 865 representing the validation user/visual element interaction matrix $R_V$, node 866 representing the validation user preference embedding matrix $P_V$, node 867 representing the validation visual element embedding matrix $Q_V$, and node 868 representing the validation latent features sparse matrix $\widehat{R_V}$. Each of the matrices represented by nodes 866, 867, and 868 in an embodiment may be generated by decomposing the validation user/visual element interaction matrix $R_V$ at node 854, based on the latent features value $k_{adj}$ at node 856.

The neural network output layer 860 may further include a node 869 representing a difference $\Delta_{RMSE}$ between the root mean square error for the test latent features sparse matrix $\widehat{R_T}$ represented at node 864 and the root mean square error for the validation latent features sparse matrix $\widehat{R_V}$ represented at node 868. As described herein, comparison of these values for each of the sparse matrices $\widehat{R_T}$ and $\widehat{R_V}$ within the output layer in an embodiment may provide a rough gauge of the similarity between these two matrices. The process of generating an output layer, based on a known set of input layer values may be described herein as forward propagation. An initial forward propagation in an embodiment may thus result in a group of decomposed matrices for the test set and for the validation set, including a test user preference embedding matrix $P_T$, a test visual element embedding matrix $R_T$, a test latent feature sparse matrix $\widehat{R_T}$, a validation user preference embedding matrix $P_V$, a validation visual element embedding matrix $R_V$, and a validation latent feature sparse matrix $\widehat{R_V}$. Further, an initial forward propagation may produce a rough gauge of the similarities between these decomposed matrices in the form of the difference $\Delta_{RMSE}$ between the root mean square error of the test latent feature sparse matrix $\widehat{R_T}$ and the root mean square error of the validation latent feature sparse matrix $\widehat{R_V}$.

The neural network may be trained to determine an optimal latent features value k by minimizing the differences between the sparse matrices generated based on the test set and the validation set. This training process may be accomplished through back propagation of an error function for the neural network. The error function for the neural network 800 in an embodiment may be the magnitude of the difference $\Delta_{RMSE}$ within the output layer 860. The integration process user matching system in an embodiment may determine the magnitude of this value at node 869 through forward propagation, then use this known error margin to adjust the weight matrices associated with each layer of the modeled neural network. For example, the integration process user matching system may perform a back-propagation method to adjust each of the weight matrices in order to more accurately reflect the correlations between minor changes to the latent features value k and the differences between root mean square errors for the latent feature sparse matrices, as described herein.

The integration process user matching system in an embodiment may perform a series of forward and backward propagations on the test and validation matrices $R_T$ and $R_V$ input into the input layer 810 until the error margin represented at node 869 of the output layer falls below a preset threshold value. For example, the integration process user matching system in an embodiment may perform repeated iterations of forward and backward propagations during a training session on the first of several test sets until the value of node 869 falls below a threshold value such as 1%, 2%, or 5%. At such a point, the training session on this first set of test data may be complete, and the weight matrices associated with each layer of the neural network may be optimized for the first set of test data and validation data.

The integration process user matching system in an embodiment may perform similar training sessions on several other sets of test data in order to further optimize the weight matrices of the neural network layers, and thus also generate the most accurate user preference embedding matrices and visual element embedding matrices. For example, multiple sets of test data may be used to generate multiple user/visual element interaction matrices $R_T$. More specifically, as described herein, the integration process user management system in an example embodiment generate one user/visual element interaction matrix to describe all data gathered on any individual day for a month, giving a total of 30 user/visual element interaction matrices. The integration process user management system in such an embodiment may then perform a training session using the user/visual element interaction matrix generated on the first day of the month as a first test set user/visual element interaction matrix $R_T$ and the user/visual element interaction matrix generated on the last day of the month as the validation test set user/visual element interaction matrix $R_V$. During a second training session, the integration process user matching system in an embodiment may input the user/visual element interaction matrix generated on the second day of the month as the test user/visual element interaction matrix $R_T$ at node 812, and the same validation set user/visual element interaction matrix $R_V$ used in the first training session. By performing the same iterative forward and backward propagation described with reference to the first training session, the integration process user matching system in an embodiment may further finely tune the weight matrices of the neural network to more accurately model user latent preferences for certain visual elements through the matrix decomposition method generating the user preference embedding matrix and the visual element embedding matrix of the final output layer 860 of the neural network. This training process for the neural network may be repeated several times in some embodiments. For example, if user/visual element interaction matrices in an embodiment are generated every day within a thirty day month, the integration process user matching system may perform twenty-nine training sessions—one for every day prior to the last day of the recording month, with the last day constituting the validation set against which all test sets are compared.

Once the neural network is trained, the neural network may apply the optimal user preference value (k) to generate a most accurate user preference embedding matrix and a most accurate visual element embedding matrix based on any newly input user/visual element interaction matrices. A dot product of these two embedding matrices may then be determined in order to identify each user's "true" preference for any given visual element, and to place matching user's with the same or complimentary preferences in contact with one another. For example, a new user/visual element interaction matrix RE (e.g., generated based on execution logs received in the month following those forming the basis of the test set and validation set) may be input at node 812 as $R_T$ of the input layer 810. In some embodiments, node 814 may include the same validation user/visual element interaction matrix $R_V$ used during the previously described training sessions. In other embodiments, node 814 may include a validation user/visual element interaction matrix $R_V$ generated following the previous training sessions. The integration process user matching system in such an embodiment may then perform the same forward and backward propagation to tune the weight matrices of the neural network until the error function given at node 869 falls below the preset threshold, as described above. The neural network 800 may then output an optimized user preference embedding matrix $P_T$ that is the $P_{OPT}$ at node 862 and an optimized visual element embedding matrix $Q_T$ that is the $Q_{OPT}$ at node 863 in the output layer 860. In such a way, the neural network 800 may continuously learn how to optimally or most accurately project user preferences while simultaneously producing an estimate of those user preferences in the form of the user preference embedding matrix $P_{OPT}$ and the visual element embedding matrix $Q_{OPT}$.

Figure 9:
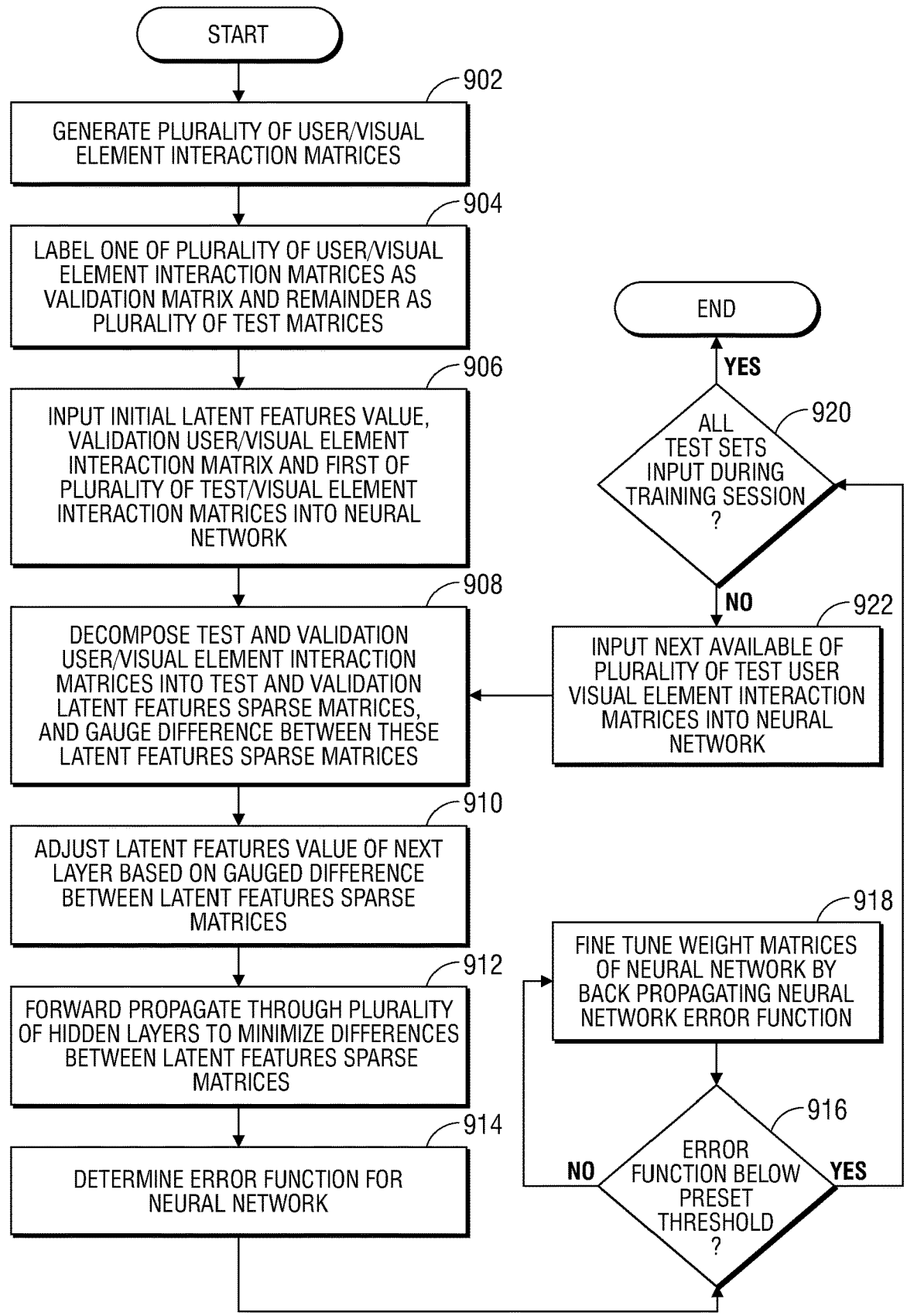
FIG. 9 is a flow diagram illustrating a method of training a neural network to generate optimal user preferences and visual elements embedding matrices according to an embodiment of the present disclosure.

FIG. 9 is a flow diagram illustrating a method of training a neural network to generate optimal user preferences and visual elements embedding matrices by iteratively adjusting a number of latent features according to an embodiment of the present disclosure. As described herein, any negative feedback from a user about a given visual element may be a latent feature contributing to preferences for or against certain visual elements and their associated subprocesses. An example of a latent feature driving user preference may be complexity of setting up the visual element within the graphical user interface, or likelihood that the subprocess associated with that visual element may execute incompletely or erroneously. These types of problems may not be recorded directly, and thus, may be a latent driving force behind user choice for a given visual element. The user/visual elements interaction matrix described with reference to FIGS. 5 and 7 may be decomposed into a group of matrices such as those described with reference to FIG. 6, that project or model the impact of these latent features on a user's preference for or against the use of certain visual elements. The accuracy of these matrices and their ability to accurately reflect the latent negative feedback of users may depend upon the number of latent features assumed as part of such a model.

The latent features value may represent the number of latent features assumed to apply to each of the sub-processes, and thus, the number of latent features each user may endorse or dislike. Because these latent features are unknown, the latent features value may be preset and adjusted in order to increase accuracy of the matrix factorization method. In an embodiment, a neural network may be trained to determine an optimal latent features value to produce the most accurate user preference embedding matrix and visual element embedding matrix, as described in greater detail with respect to FIG. 8.

At block 902, the integration process user matching system in an embodiment may generate a plurality of user/visual element interaction matrices based on stored counters associated with multiple users and multiple visual elements. For example, in an embodiment described with reference to FIG. 5, the integration process user matching system may generate a user/visual element interaction matrix 500 recording each execution by one of a plurality of users 510 of each of a plurality of visual elements 520. As also described in an embodiment with reference to FIG. 7, a user/visual element interaction matrix reflecting each execution of a code set associated with a specific visual element by a specific user over a preset time period may be generated. In other words, several user/visual element interaction matrices may be generated over time using the method described with reference to FIG. 7.

The integration process user matching system at block 904 in an embodiment may identify a user/visual element interaction matrix generated using the most recently gathered data as a validation set and may identify several other user/visual element interaction matrices gathered using less recent data as test sets. For example, the integration process user management system in an example embodiment may gather execution logs daily over a one-month period, from a plurality of users, in one embodiment. Any time frame or number of execution log inputs may be used according to embodiments described herein. The integration process user management system in such an embodiment may then generate one user/visual element interaction matrix to describe all data gathered on any individual day of that month or other sample period. In the example period of one month, this gives a total of 30 user/visual element interaction matrices. In an example embodiment, the most recent of these 30 user/visual element interaction matrices (e.g., generated based on execution logs received on the last day of the month) may be labeled as the validation user/visual element interaction matrix $R_V$. The remaining 29 user/visual element interaction matrices (e.g., generated based on execution logs received every day prior to the last day of the month) may be labeled as test user/visual element interaction matrices $R_T$.

At block 906, the integration process user matching system in an embodiment may input an initial latent features value, a validation user/visual element interaction matrix, and a first of the plurality of test user/visual element interaction matrices into the neural network. For example, in an embodiment described with reference to FIG. 8, the most recent of these 30 (or other test set number) user/visual element interaction matrices (e.g., generated based on execution logs received on the last day of the month, for example) labeled as the validation user/visual element interaction matrix $R_V$ may be input into the neural network as node 814 in the input layer 810. In such an embodiment, the first of the test user/visual element interaction matrices (e.g., generated based on execution logs received on the first twenty-nine days of the month, for example) may be labeled as the test user/visual element interaction matrix $R_T$ and associated with node 812 of input layer 810 for an initial propagation of the training session for each round of training of the neural network. With 29 test sets of user/visual element interaction matrices $R_T$ (each generated based on one of the first 29 days of a thirty day month, for example), the neural network may be trained and refined with these 29 data sets to optimize a latent features value for determining a user's "true" preference for each visual element or other descriptive feature of a user's integration process.

The integration process user matching system in an embodiment at block 908 may decompose the user/visual element interaction matrices. For example, in an embodiment described with reference to FIG. 8, the embedding layer 820 may include a node 821 representing the test user/visual element interaction matrix $R_T$, node 822 representing the test user preference embedding matrix $P_T$, node 823 representing the test visual element embedding matrix $Q_T$, and node 824 representing the test latent features sparse matrix $\widetilde{R_T}$. The test user/visual element interaction matrix $R_T$ at node 821 in an embodiment may represent the recorded positive feedback within a test set of data of several users with respect to several visual elements, as described in greater detail with respect to FIGS. 5 and 7.

As another example, the first embedding layer 820 may include a node 825 representing the validation user/visual element interaction matrix $R_V$, node 826 representing the validation user preference embedding matrix $P_V$, node 827 representing the validation visual element embedding matrix $Q_V$, and node 828 representing the validation latent features sparse matrix $\widetilde{R_V}$. The validation user/visual element interaction matrix $R_V$ at node 825 in an embodiment may represent the recorded positive feedback within a validation set of data of several users with respect to several visual elements, as described in greater detail with respect to FIGS. 5 and 7.

The test user preference embedding matrix $P_T$ at node 822, test visual element embedding matrix $Q_T$ at node 823, and test latent features sparse matrix $\widetilde{R_T}$ at node 824 in an embodiment may represent the matrices generated by decomposing the test user/visual element interaction matrix $R_T$ at node 812 (e.g., using a singular value decomposition method), based on the initial latent features value $k_{init}$ at node 816. Similarly, the validation user preference embedding matrix $P_V$ at node 826, validation visual element embedding matrix $Q_V$ at node 827, and validation latent features sparse matrix $\widehat{R_V}$ at node 828 in an embodiment may represent the matrices generated by decomposing the validation user/visual element interaction matrix $R_V$ at node 814 (e.g., using a singular value decomposition method), based on the initial latent features value $k_{init}$ at node 816. For example, as an example of matrix factorization described in an embodiment with respect to FIG. 6, the integration process user matching system may employ a matrix factorization method to decompose one of the user/visual element interaction matrices in the input layer into a user preference embedding matrix 612, a visual element embedding matrix 622, and a latent features sparse matrix 632, based on a preset latent features value k. The user preference embedding matrix 612 in such an embodiment may estimate each of a plurality of users' preferences for a plurality of latent features (k), which represent underlying characteristics of each visual element (or other description of a given integration process). The visual element embedding matrix 622 in such an embodiment may estimate the degree to which each of these underlying characteristics apply to each of the individual visual elements (or other descriptors of a given integration process—e.g., number of documents transacted).

As described herein, the matrix factorization method may be used to decrease the number of variables required to determine a user's true preferences (including consideration of latent features) that are unknown. Such a matrix factorization method may involve generating three new matrices that are interrelated according to preset requirements, based on the user/visual element interaction matrix. By applying these preset requirements, the number of unknown variables may be decreased. For example, in an embodiment described with reference to FIG. 6, such a method may involve generating the latent features sparse matrix 632 such that it is the dot product of the user preference embedding matrix and the visual elements embedding matrix, and it has non-zero values only in the cells that are oriented diagonally across the latent features sparse matrix 632. In other words, most of the values within this latent features sparse matrix 632 are set to zero, and thus are known, decreasing the number of unknown variables used to determine the values in the user preference embedding matrix 612 and the visual element embedding matrix 622.

Such a decomposition may be performed using matrix factorization methods in an embodiment, such as for example, a singular value decomposition algorithm. The test matrices (e.g., 822, 823, and 824) in an embodiment may differ from the validation matrices (e.g., 826, 827, and 828) because the test matrices are generated based on the test user/visual element interaction matrix $R_T$ at 812, and the validation matrices are generated based on the validation user/visual element interaction matrix $R_V$ at 814. However, the test matrices and validation matrices may be generated using the same matrix decomposition method (e.g., singular value decomposition, for example), and the same latent features value $k_{init}$ at node 816.

The latent features value in an embodiment may represent the number of latent features assumed to apply to each of the sub-processes associated with visual elements, and thus, the number of latent features each user may endorse or dislike. Because these latent features are unknown, the latent features value may be preset and adjusted in order to increase accuracy of the matrix factorization method. The goal of the training session for the neural network in an embodiment may be to optimize the latent features value and thus optimize accuracy of the matrix factorization method.

To this end, and as also described in an embodiment with reference to FIG. 8, the integration process user matching system in an embodiment may further determine a rough gauge of the differences between the latent features sparse matrix $\widehat{R_T}$ produced based on the test data and the latent features sparse matrix $\widehat{R_V}$ produced based on the validation data, such as the most recent set of data gathered in a series of samples of data. As the number of latent features approaches an optimal number, the latent feature user preference values of each user for each visual element determined based on the test data should get closer to or match the latent feature user preference values of each user for each visual element determined based on the validation data. In other words, an optimal number of latent features should generate a consistent "true" user preference (e.g., latent feature user preference value) with greater accuracy of assessment of a user's preferences in development of a business integration system, regardless of the dataset upon which such a user preference is determined.

The latent feature user preference value of a given user for a given visual element (or other descriptor of a user's integration process) may be determined by taking the dot product of the row within the user preference embedding matrix associated with the given user and the column within the visual element embedding matrix associated with the given visual element. As such, values within the user preference embedding matrix and visual element embedding matrix generated based on the test data in an embodiment may become increasingly similar to values within the user preference embedding matrix and visual element embedding matrix generated based on the validation data as the latent features value approaches an optimal value.

Because a latent features sparse matrix is specifically generated to incorporate the dot products of its corresponding user preference embedding matrix and visual element embedding matrix in an embodiment, the latent features sparse matrix may represent a rough gauge of the values within these corresponding user preference embedding matrix and visual element embedding matrix. Thus, comparing the differences between the latent features sparse matrix $\widehat{R_T}$ generated based on the test data and latent features sparse matrix $\widehat{R_V}$ generated based on the validation data may provide a rough gauge of the differences between the user preferences reflected in latent features user preference values generated based on the test data and the user preferences reflected in latent features user preference values generated based on the validation data. As described herein, this difference may approach zero as the latent features value approaches an optimal value.

A quick reference for gauging the magnitude or contents of the test latent feature sparse matrix $\widehat{R_T}$ and validation latent feature sparse matrix $\widehat{R_V}$ in an embodiment may include determining the root mean square error for these matrices. By comparing the root mean square error for two separate latent feature sparse matrices in an embodiment, the integration process user matching system may determine the degree to which the two latent feature sparse matrices (and implicitly their corresponding user preference embedding matrix and visual element embedding matrix) are similar or similarly model a user's preferences. For example, at node 829 of the first embedding layer 820 in an embodiment, the integration process user matching system may determine a difference $\Delta_{RMSE}$ between the root mean square error for the test latent features sparse matrix $\widehat{R_T}$ at node 824 and the validation latent features sparse matrix $\widehat{R_V}$ at node 828. The latent features value k used to generate these validation latent features sparse matrix may be optimized in an embodiment by minimizing this difference $\Delta_{RMSE}$.

At block 910, the integration process user matching system may adjust the latent features value of the next layer within the neural network based on the gauged difference between the latent features sparse matrices. For example, in an embodiment described with reference to FIG. 8, the neural network may be trained to determine an optimal latent features value k by minimizing the differences between the sparse matrices generated based on the test set and the validation set. Thus, the value of $\Delta_{RMSE}$ as determined at node 829 in the first embedding layer 820 may be used to adjust the value of the latent features value k in the following layer using an algorithm for minimizing $\Delta_{RMSE}$. For example, a gradient descent method may be employed to adjust the latent features value k for the second embedding layer 830 based on the value of $\Delta_{RMSE}$ at node 829 of the first embedding layer 820. In such a way, the integration process user matching system may train the neural network to drive the differences between the latent features sparse matrix $\widehat{R_T}$ generated based on the test data and latent features sparse matrix $\widehat{R_V}$ generated based on the validation data toward zero. This may consequently also drive the latent features value toward an optimal value.

The integration process user matching system may forward propagate through the plurality of hidden layers of the neural network to iteratively minimize differences between the latent features sparse matrices at block 912. For example, in an embodiment described with reference to FIG. 8, the neural network 800 may also include a plurality of hidden layers, including layers 840 and 850. The neural network 800 may include any number of hidden layers, arranged as a series of layer-pairs, to determine a degree of difference between latent feature sparse matrices generated based on the same latent features value, but different user/visual element interaction matrices. This degree of difference may then be used to adjust the latent features value used to generate the latent feature sparse matrices within the next layer pair.

At block 914, the integration process user matching system in an embodiment may determine an error function for the neural network by determining a magnitude of difference between the root mean square error of the test latent feature sparse matrix and a root mean square error of the validation latent feature sparse matrix of the final hidden layer. For example, in an embodiment described with reference to FIG. 8, the neural network of the integration process user matching system may produce an output layer 860, including node 864 representing the test latent features sparse matrix $\widehat{R_T}$, node 868 representing the validation latent features sparse matrix $\widehat{R_T}$, and node 869 representing a difference $\Delta_{RMSE}$ between the root mean square error for the test latent features sparse matrix $\widehat{R_V}$ represented at node 864 and the root mean square error for the validation latent features sparse matrix $\widehat{R_T}$ represented at node 868. As described herein, comparison of these values for each of the sparse matrices $\widehat{R_V}$ and $\widehat{R_T}$ within the output layer in an embodiment may provide a rough gauge of the similarity between these two matrices. An initial forward propagation in an embodiment may thus produce a rough gauge of the similarities between these decomposed matrices in the form of the difference $\Delta_{RMSE}$ between the root mean square error of the test latent feature sparse matrix $\widehat{R_V}$ and the root mean square error of the validation latent feature sparse matrix $\widehat{R_T}$. This difference $\Delta_{RMSE}$ at node 869 may represent the error function for the neural network 800.

The integration process user matching system may determine at block 916 whether the error function for the neural network falls below a preset threshold value in an embodiment. For example, in an embodiment described with reference to FIG. 8, the integration process user matching system may determine whether the value $\Delta_{RMSE}$ represented at node 869 falls below a preset threshold value of say, 1%, 2%, or 5%. This value may be preset to any tolerance, and these are just a few examples of such a threshold value. The smaller the threshold value is in an embodiment, the more refined or accurate the user preference projections generated using the neural network may be. However, a smaller threshold value may result in longer training sessions, as failure to fall below this threshold value following a forward propagation may result in a backward propagation and another forward propagation being added to the current training session. If the error function does not fall below the preset threshold in an embodiment, further training of the neural network, via more training sessions may be needed, and the method may proceed to block 918. If the error function does fall below the preset threshold in an embodiment, the neural network may be sufficiently trained based on the first set of test data input into the neural network at block 906, and the method may proceed to block 920 to determine whether training sessions based on other test data are required or needed.

At block 918 in an embodiment, the integration process user matching system may fine tune the weight matrices of the neural network through backward propagation of the error function. As described herein, these weight matrices may be unique to the architecture and functionality of the neural network in an embodiment, and may not directly describe any aspect of the user/visual element interaction matrices, user preference embedding matrices, visual element embedding matrices, or latent features sparse matrices also described herein. During training of the neural network, the values generated within the output layer may differ from the known correct value by some degree, described herein as the "error function" of the neural network. The goal of such a training session may be to decrease this "error function" until the neural network is capable of outputting values very close or identical to the known correct value.

The value of nodes within each hidden layer and the output layer in an embodiment may depend upon the value of one or more nodes in the previous layer. Each node within each layer of a neural network in an embodiment may be associated with several weights that each describes the degree to which a node within a given layer depends upon a value of a node within the previous layer. The weights associated with each node in a given layer may be combined to form a weight matrix for that given layer that describes the degree to which the values of each node of a given layer depend upon the values of each node in the previous layer.

During a training session, these weight matrices may be incorrect, which would result in an incorrect output value (e.g., the output value compared against the known, correct value, as described directly above). Thus, the degree to which the output value during a training session differs from the known correct value may reflect the degree to which the weight matrices of the multiple layers of the neural network are incorrect and need to be adjusted. To address this issue, the error function determined by comparing the output value generated during a training session and the known, correct value may be back propagated through the neural network, to adjust the weight matrices associated with each layer.

The neural network may then forward propagate the same input nodes that were used previously (e.g., to generate the output value that differed from the known, correct value by the error function), but apply these adjusted weight matrices to produce different values at each node of each layer. Thus, this forward propagation may produce a different value at the output node than was previously produced. This new output node value may then be compared against the known, correct value again, to determine if they are sufficiently similar to one another to indicate the neural network is fully trained. Such a back propagation and forward propagation may be repeated serially until the output value of the neural network falls within a preset threshold tolerance of the known, correct value. At that point, the neural network may be said to be trained to produce correct outputs based on any given input.

The neural network in an embodiment may be trained to generate optimal or more accurate user preference embedding matrices and visual element embedding matrices by minimizing the differences between the sparse matrices generated based on the test set and the validation set. This training process may be accomplished through back propagation of an error function for the neural network. The error function for the neural network 800 in an embodiment may be the magnitude of the difference $\Delta_{RSME}$ represented at node 869 within the output layer 860. The integration process user matching system in an embodiment may determine the magnitude of this value at node 869 through forward propagation, then use this known error margin to adjust the weight matrices associated with each layer of the modeled neural network. For example, the integration process user matching system may perform a back-propagation method to adjust each of the weight matrices in order to more accurately reflect the correlations between minor changes to the latent features value k and the differences between root mean square errors for the latent feature sparse matrices, as described herein. This step may also include forward propagating back through the neural network using the inputs described at block 906, but with adjusted weight matrices applied to each of the layers of the neural network. This may produce a new output layer, including a new error function represented by the difference $\Delta_{RSME}$ at node 869. The method may then proceed back to block 916 to determine whether the new error function is below the preset threshold. By repeating the loop between blocks 916 and 918 in such a manner, the integration process user matching system in an embodiment may train the neural network based on the first set of test data and fine tuning of the weight matrices. The method may then proceed to block 920 to determine whether further training sessions on other test data may be needed.

The integration process user matching system in an embodiment may determine at block 920 whether all test sets have been input into the neural network during the training session. The integration process user matching system in an embodiment may perform training sessions on several sets of test data in order to further optimize the weight matrices of the neural network layers, and thus also generate the most accurate user preference embedding matrices and visual element embedding matrices. For example, the integration process user management system in an example embodiment generate one user/visual element interaction matrix to describe all data gathered on any individual day for a month, giving total of 30 user/visual element interaction matrices. In an embodiment in which the integration process user management system performs the first training session using the user/visual element interaction matrix generated on the first day of the month as a first test set matrix $R_T$ and the user/visual element interaction matrix generated on the last day of the month as the validation test set matrix $R_V$, 28 further test sets may be prepared for training of the neural network. If each of the test sets $R_T$ and $R_V$ have not been input into the neural network, the method may proceed to block 922 for analysis of another test set. If each of the test sets have been input into the neural network, the weight matrices may be finely tuned to produce an optimal user preference embedding matrix and optimal visual element embedding matrix based on future generated user/visual element interaction matrices, and the method may end.

At block 922, in an embodiment in which each of the test sets have not been input into the neural network and the weight matrices finely tuned based on each of these inputs, the training method may proceed to input of a second training set of data. For example, during a second training session, the integration process user matching system in an embodiment may input into the neural network the user/visual element interaction matrix generated on the second day of the month as the test user/visual element interaction matrix $R_T$, and the same validation set user/visual element interaction matrix $R_V$ used in the first training session. The method may then proceed back to block 908 for an initial forward propagation of these input values through the neural network. By performing the same iterative forward and backward propagation described with reference to the first training session through the loop between blocks 908 and 922, the integration process user matching system in an embodiment may further finely tune the weight matrices of the neural network to more accurately model user latent preferences for certain visual elements through the matrix decomposition method generating the user preference embedding matrix and the visual element embedding matrix of the final output layer 860 of the neural network. This may result in a fully trained neural network.

Figure 10:
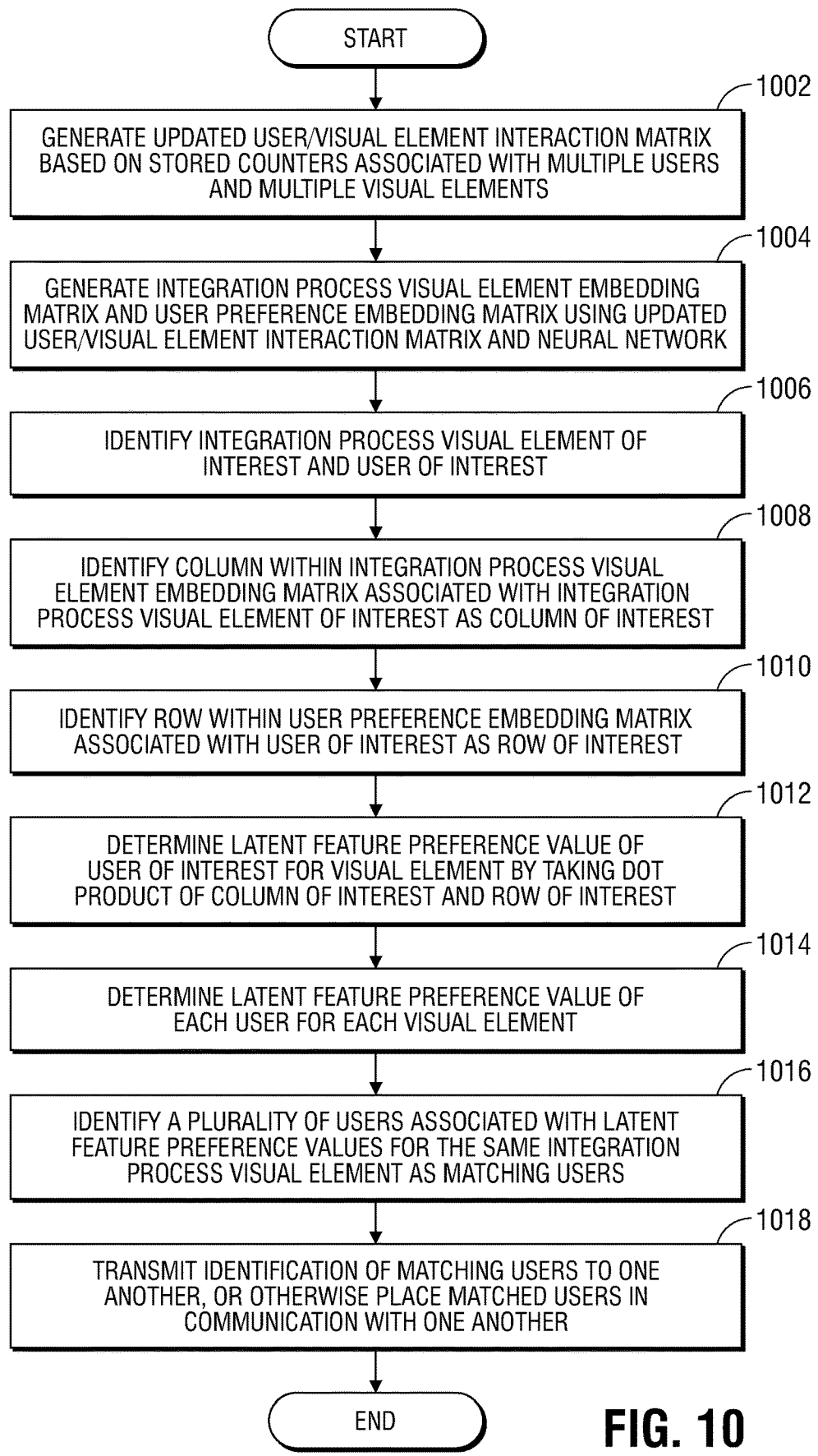
FIG. 10 is a flow diagram illustrating a method of matching users based on optimized user preference and visual element embedding matrices according to an embodiment of the present disclosure.

FIG. 10 is a flow diagram illustrating a method of matching users based on optimized user preference and visual element embedding matrices generated using the trained neural network according to an embodiment of the present disclosure. As described herein, the neural network may be trained to produce an optimized user preference embedding matrix and an optimized visual element embedding matrix (e.g., as described with reference to FIG. 6) that implicitly take into account user like or dislike for a plurality of unknown, latent features. Upon completion of such training, the neural network may be used to produce such optimal matrices (e.g., user preference embedding matrix 612 and visual element embedding matrix 622) based on freshly gathered user/visual element interaction matrices such as that described with reference to FIG. 5 (e.g., not included within the test or validation test sets used to train the neural network). An individual user's preferences for any given visual element in an embodiment may then be determined by taking the dot product of portions of these optimized matrices. Two or more users having similar preferences for the same visual elements or a group of visual elements may then be "matched," and placed in contact with one another.

At block 1002, the integration process user matching system in an embodiment may generate an updated user/visual element interaction matrix based on stored counters associated with multiple users and multiple visual elements. For example, in an embodiment described with reference to FIG. 5, the integration process user matching system may generate a user/visual element interaction matrix 500 recording each execution by one of a plurality of users 510 of each of a plurality of visual elements 520. As also described in an embodiment with reference to FIG. 7, a user/visual element interaction matrix reflecting each execution of a code set associated with a specific visual element by a specific user over a preset time period may be generated. Such an updated user/visual element interaction matrix in an embodiment may be formed based on data gathered from execution logs received after the training of the neural network has been completed, for example. In other words, the method described with reference to FIG. 7 may be used in an embodiment to generate a plurality of user/visual element interaction matrices within a test set of data, a user/visual element interaction matrix for a validation set of data, and a new user/visual element interaction matrix generated after the training of the neural network has been performed.

The integration process user matching system in an embodiment at block 1004 may generate an integration process visual element embedding matrix and user preference embedding matrix using the fully trained and optimized neural network operating upon an input of the updated user/visual element interaction matrix. For example, in an embodiment described with reference to FIG. 8, once the neural network 800 is fully trained, the updated user/visual element interaction matrix RE (e.g., generated based on execution logs received in the month following those forming the basis of the test set and validation set) may be input as $R_T$ at node 812 of the input layer 810. The neural network 800 may then output an optimized user preference embedding matrix $P_{OPT}$ at node 862 as $P_T$ and an optimized visual element embedding matrix $Q_{OPT}$ at node 863 as $Q_T$ in the output layer 860 from the trained neural network.

At block 1006, the integration process user matching system may identify an integration process visual element of interest and a user of interest. For example, in an embodiment described with reference to FIG. 6, the user preference embedding matrix 612 may represent the optimized user preference embedding matrix $P_{OPT}$ and the visual elements embedding matrix 622 may represent the optimized visual element embedding matrix $Q_{OPT}$ output at block 1004 by the neural network. In such an embodiment, user A may be identified as the user of interest, and the HTTP connector visual element may be identified as the visual element of interest. In other embodiments, another user may be identified as the user of interest, and any other visual element or other descriptor for the users' integration processes provided within the user/visual element interaction matrix may be identified as the visual element of interest. The method of FIG. 10 may be performed for every combination of a user and a visual element (or other descriptor of a user's integration process) given in the user/visual element interaction matrix in an embodiment. In such a way, each user's preference for each visual element (or other descriptor) or group of visual elements may be determined.

The integration process user matching system in an embodiment may identify a column within the integration process visual element embedding matrix associated with the integration process visual element of interest as the column of interest at block 1008. For example, in an embodiment described with reference to FIG. 6, the embedding matrices 612 and 622 may represent optimized matrices output by the neural network at block 1004. In such an embodiment, the integration process user matching system may identify the left-most column of the visual elements embedding matrix 622, associated with the HTTP connector visual element of interest, as the column of interest.

At block 1010, the integration process user matching system in an embodiment may identify a row within the user preference embedding matrix associated with the user of interest as the row of interest. For example, in an embodiment described with reference to FIG. 6, the embedding matrices 612 and 622 may represent optimized matrices output by the neural network at block 1004. In such an embodiment, the integration process user matching system may identify the top-most row of the user preference embedding matrix 612, associated with the user of interest (e.g., user A), as the row of interest.

The integration process user matching system in an embodiment may determine a latent feature preference value of the user of interest for the visual element of interest by taking the dot product of the column of interest and the row of interest at block 1012. For example, the integration process user matching system in an embodiment described with reference to FIG. 6 may determine user A's latent feature preference value for the HTTP connector visual element by taking the dot product of the top row of the user preference embedding matrix 612 and the left-most column of the visual elements embedding matrix. This dot product may yield a single value gauging user A's preference for the HTTP connector visual element, while taking into account implicit, but unknown negative feedback.

At block 1014, the integration process user matching system in an embodiment may determine a latent feature preference value of each user for each visual element by repeating the process described directly above for each user and each visual element (or other integration process descriptor) given within the user/visual element interaction matrix. The process of blocks 1006-1012 in an embodiment may provide a latent features preference of the users identified within the updated user/visual element interaction matrix for the visual elements identified within the updated user/visual element interaction matrix.

The integration process user matching system in an embodiment may identify a plurality of users associated with similar latent feature preference values for the same integration process visual element as "matching" users relative to that integration process visual element at block 1016. The degree to which the latent feature preference values must correspond in order to "match," may vary according to various embodiments. For example, two users may be said two have "matching" latent feature preference values for a single visual element in an embodiment if their respective latent feature preference values fall within a certain percentage of one another (e.g., 0.5%, 1%, 5%, etc.). In other embodiments, a mean or average value of all known latent feature values may be determined, and two latent feature preference values may be said to "match" one another if they are closer to one another than either of them is the mean or average. In doing so, the integration process user matching system may identify a group of users employing similar integration process sub-processes, and potentially encountering the same types of issues during execution of those integration processes, or even during their regular courses of business.

At block 1018, the integration process user matching system in an embodiment may transmit identification of matching users to one another, or otherwise place matched users in communication with one another. In such a way, the integration process user matching system may place these like-minded users in contact with one another to form a community of users that may benefit from one another's insights into troubleshooting, business development, or scaling up of existing processes. The method may then end.

The blocks of the flow diagrams 7, 9, and 10 discussed above need not be performed in any given or specified order and may be executed as code instructions at one or a plurality of processors during preparation and set up of a modeled integration process or of a deployed integration process as described herein. It is contemplated that additional blocks, steps, or functions may be added, some blocks, steps or functions may not be performed, blocks, steps, or functions may occur contemporaneously, and blocks, steps or functions from one flow diagram may be performed within another flow diagram. Further, those of skill will understand that additional blocks or steps, or alternative blocks or steps may occur within the flow diagrams discussed for the algorithms above.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating an integration process user matching system comprising:
    a network interface device receiving a plurality of execution logs recording data for tracking selections of integration process visual elements by a plurality of users for developing integration processes;
    a processor generating a user/visual element interaction matrix based on a plurality of counts of integration process visual element selections;
    the processor inputting the user/visual element interaction matrix into a trained neural network to generate an optimized user preference embedding matrix and an optimized visual element embedding matrix;
    the processor determining a latent feature user preference value for increasing accuracy of preferences in user feedback by incorporating negative feedback from the plurality of users for each of the plurality of integration process visual elements based on the optimized user preference embedding matrix and the optimized visual element embedding matrix;
    the processor identifying a subset of matching users associated with latent feature user preference values for one of the plurality of integration process visual elements falling within a preset range of each other as matching users; and
    the network interface device transmitting identification of the subset of matching users and identification of the one of the plurality of integration process visual elements to at least one matching user.

2. The information handling system of claim 1 further comprising:
    the processor generating a plurality of test user/visual element interaction matrices and a validation user/visual element interaction matrix based on the plurality of counts of recorded visual element selections over a period of time during machine learning training to conduct correlation between the test user/visual element interaction matrices and the validation user/visual element interaction matrix for improved machine learning training for user matching.

3. The information handling system of claim 1 further comprising:
    the processor decomposing a test user/visual element interaction matrix to generate the test latent feature sparse matrix to conduct correlation between test user preference data and validation user preference data for improved machine learning training for user matching.

4. The information handling system of claim 1 further comprising:
    the processor decomposing the validation user/visual element interaction matrix to generate a validation latent feature sparse matrix using a singular value decomposition method for conducting correlation between test user preference data and validation user preference data for improved machine learning training for user matching.

5. The information handling system of claim 1 further comprising:
    the processor training a neural network, based on a test user/visual element interaction matrix, a validation user/visual element interaction matrix, and an initial preset latent features value by minimizing a difference between a root mean square error for the test latent feature sparse matrix and a root mean square error for a validation latent feature sparse matrix to increase correlation between test latent features user preference values and validation latent features user preference values to optimize accuracy of user preference assessments and improve user matching.

6. The information handling system of claim 1 further comprising:
    the processor determining the latent feature user preference value of one of the plurality of users for one of the plurality of integration process visual elements by taking a dot product of a column within the optimized visual elements embedding matrix associated with the one of the plurality of integration process visual elements and a row within the optimized user preference embedding matrix associated with the one of the plurality of users.

7. The information handling system of claim 1 further comprising:
    a graphical user interface receiving an instruction from a first of the plurality of users to insert a first of the plurality of integration process visual elements into a modeled flow for a first integration process;
    the processor associating the first of the plurality of integration process visual elements with a first code set and a runtime engine; and
    the network interface device transmitting the first code set and the runtime engine to a remote location for execution by the first of the plurality of users and recording a count of integration process visual element selections in an execution log.

8. A method of matching integration process users comprising:
    receiving, via a network interface device, a plurality of execution logs recording data for tracking selections of integration process visual elements by a plurality of users for developing integration processes;

generating, via a processor, a user/visual element interaction matrix based on a plurality of counts of integration process visual element selections;

inputting the user/visual element interaction matrix into a trained neural network to generate an optimized user preference embedding matrix and an optimized visual element embedding matrix for determining a latent feature user preference value to adapt positive user feedback to incorporate negative feedback of selection or non-selection by users for the integration process visual elements;

identifying a subset of matching users associated with latent feature user preference values for one of the plurality of integration process visual elements falling within a preset range of each other as matching users; and transmitting, via the network interface device, identification of the subset of matching users and identification of the one of the plurality of integration process visual elements to at least one matched user.

9. The method of claim 8 further comprising:

generating, via the processor, a plurality of test user/visual element interaction matrices and a validation user/visual element interaction matrix based on the plurality of counts of recorded visual element selections over a period of time during machine learning training to conduct correlation between the test user/visual element interaction matrices and the validation user/visual element interaction matrix for improved machine learning training for user matching.

10. The method of claim 8 further comprising:

training a neural network, via the processor, based on a test user/visual element interaction matrix, a validation user/visual element interaction matrix, and an initial preset latent features value by minimizing a difference between a root mean square error for the test latent feature sparse matrix and a root mean square error for a validation latent feature sparse matrix to increase correlation of test latent features user preference values and validation latent features user preference values to increase correlation between test latent features user preference values and validation latent features user preference values to optimize accuracy of user preference assessments and improve user matching.

11. The method of claim 9 further comprising:

decomposing a test user/visual element interaction matrix during machine learning training to generate the test latent feature sparse matrix using a singular value decomposition method to conduct correlation between test user preference data and validation user preference data for improved machine learning training for user matching.

12. The method of claim 9 further comprising:

decomposing a validation user/visual element interaction matrix during machine learning training to generate the validation latent feature sparse matrix to conduct correlation between test user preference data and validation user preference data for improved machine learning training for user matching.

13. The method of claim 8 further comprising:

determining the latent feature user preference value of one of the plurality of users for one of the plurality of integration process visual elements by taking a dot product of a column within the optimized visual elements embedding matrix associated with the one of the plurality of integration process visual elements and a row within the optimized user preference embedding matrix associated with the one of the plurality of users.

14. The method of claim 8 further comprising:

a graphical user interface receiving an instruction from a first of the plurality of users to insert a first of the plurality of integration process visual elements into a modeled flow for a first integration process;

the processor associating the first of the plurality of integration process visual elements with a first code set and a runtime engine; and the network interface device transmitting the first code set and the runtime engine to a remote location for execution by the first of the plurality of users and rendering a count of integration process visual element selections in an execution log.

15. An information handling system operating an integration process user matching system comprising:

a network interface device receiving a plurality of execution logs recording data for tracking selections of integration process visual elements by a plurality of users for developing integration processes;

a processor training a neural network, based on a test user/visual element interaction matrix, a validation user/visual element interaction matrix, and an initial preset latent features value to increase correlation between test latent features user preference values determined based on the test user/visual element interaction matrix and validation latent features user preference values determined based on the validation user/visual element interaction matrix for optimizing accuracy of user preference assessments to improve user matching;

the processor generating a matching assessment user/visual element interaction matrix based on a plurality of counts of integration process visual element selections received after training the neural network and inputting the matching assessment user/visual element interaction matrix into a trained neural network to generate an optimized user preference embedding matrix and an optimized visual element embedding matrix;

the processor determining a latent feature user preference value to incorporate negative feedback of the plurality of users for each of the plurality of integration process visual elements based on the optimized user preference embedding matrix and the optimized visual element embedding matrix;

the processor identifying a subset of matching users associated with latent feature user preference values for one of the plurality of integration process visual elements falling within a preset range of each other as matching users; and the network interface device transmitting identification of the subset of matching users and identification of the one of the plurality of integration process visual elements to at least one matching user.

16. The information handling system of claim 15 further comprising:

the processor generating a plurality of test user/visual element interaction matrices and a validation user/visual element interaction matrix based on the plurality of counts of recorded visual element selections over a period of time during machine learning training to conduct correlation between the test user/visual element interaction matrices and the validation user/visual element interaction matrix for improved machine learning training for user matching.

17. The information handling system of claim 15 further comprising:
the processor decomposing the test user/visual element interaction matrix to generate a test latent feature sparse matrix to conduct correlation between test user preference data and validation user preference data for improved machine learning training for user matching.

18. The information handling system of claim 15 further comprising:
the processor decomposing the validation user/visual element interaction matrix to generate a validation latent feature sparse matrix to conduct correlation between test user preference data and validation user preference data for improved machine learning training for user matching.

19. The information handling system of claim 15, wherein each of a plurality of executions of code sets recorded within the plurality of execution logs constitutes a selection by one of the plurality of users of one of the plurality of integration process visual elements.

20. The information handling system of claim 15 wherein the selection by one of the plurality of users of one of the plurality of integration process visual elements comprises positive feedback.

\* \* \* \* \*